(12) United States Patent
Liu et al.

(10) Patent No.: US 11,411,789 B2
(45) Date of Patent: Aug. 9, 2022

(54) METHOD AND APPARATUS FOR GENERATING SPREAD SYMBOLS

(71) Applicant: NTT DOCOMO, INC., Tokyo (JP)

(72) Inventors: Wenjia Liu, Beijing (CN); Xiaolin Hou, Beijing (CN); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 31 days.

(21) Appl. No.: 16/647,172

(22) PCT Filed: Sep. 11, 2018

(86) PCT No.: PCT/CN2018/105028
§ 371 (c)(1),
(2) Date: Mar. 13, 2020

(87) PCT Pub. No.: WO2019/052441
PCT Pub. Date: Mar. 21, 2019

(65) Prior Publication Data
US 2021/0184907 A1    Jun. 17, 2021

(30) Foreign Application Priority Data

Sep. 18, 2017    (CN) .......................... 201710842765.3

(51) Int. Cl.
*H04L 27/06*    (2006.01)
*H04L 27/26*    (2006.01)
(Continued)

(52) U.S. Cl.
CPC ......... *H04L 27/2605* (2013.01); *H04W 24/06* (2013.01); *H04W 24/08* (2013.01);
(Continued)

(58) Field of Classification Search
CPC .. H04L 27/2605; H04W 24/06; H04W 24/08; H04W 72/0466; H04W 72/048; H04W 72/085
See application file for complete search history.

(56) References Cited

U.S. PATENT DOCUMENTS

2015/0043540 A1* 2/2015 Nikopour .............. H04B 7/2628
370/335
2015/0282185 A1* 10/2015 Nikopour .............. H04L 1/0015
370/329
(Continued)

FOREIGN PATENT DOCUMENTS

CN    101047402 A    10/2007
CN    101388683 A    3/2009
(Continued)

OTHER PUBLICATIONS

Saito et al., "Non-Orthogonal Multiple Access (NOMA) for Cellular Future Radio Access", Jun. 2013, IEEE, 2013 IEEE 77th Vehicular Technology Conference (VTC Spring), pp. 1-5, Total pp. 5 (Year: 2013).*
(Continued)

*Primary Examiner* — Shah M Rahman
(74) *Attorney, Agent, or Firm* — Osha Bergman Watanabe & Burton LLP

(57) ABSTRACT

The present disclosure provides a method and apparatus for generating spread symbols. The method includes: determining a spreading sequence according to a spreading sequence matrix, where the spreading sequence matrix is generated according to performance parameters of a plurality of user terminals; and spreading initial symbols by using the determined spreading sequence to generate spread symbols.

17 Claims, 2 Drawing Sheets

100

Determining a spreading sequence according to a spreading sequence matrix, where the spreading sequence matrix is generated according to performance parameters of a plurality of user terminals — S101

Spreading initial symbols by using the determined spreading sequence to generate spread symbols — S102

(51) Int. Cl.
*H04W 24/06* (2009.01)
*H04W 24/08* (2009.01)
*H04W 72/04* (2009.01)
*H04W 72/08* (2009.01)

(52) U.S. Cl.
CPC ..... *H04W 72/048* (2013.01); *H04W 72/0466* (2013.01); *H04W 72/085* (2013.01)

(56) References Cited

U.S. PATENT DOCUMENTS

| | | | | |
|---|---|---|---|---|
| 2015/0303988 | A1* | 10/2015 | Johansson | H04B 1/709 375/150 |
| 2016/0105896 | A1* | 4/2016 | Bayesteh | H04L 1/0009 370/342 |
| 2016/0262167 | A1* | 9/2016 | Lan | H04L 1/0035 |
| 2016/0330695 | A1* | 11/2016 | Benjebbour | H04L 1/0009 |
| 2017/0033832 | A1* | 2/2017 | Dang | H04B 7/0678 |
| 2017/0155484 | A1* | 6/2017 | Kang | H04L 1/0041 |
| 2017/0251517 | A1* | 8/2017 | Kimura | H04W 52/30 |
| 2018/0026743 | A1* | 1/2018 | Zhang | H04L 5/0092 370/329 |
| 2018/0027507 | A1* | 1/2018 | Hojeij | H04W 72/0473 455/522 |
| 2018/0035406 | A1* | 2/2018 | Hao | H04L 5/0046 |
| 2018/0041988 | A1* | 2/2018 | Lee | H04L 1/1854 |
| 2018/0077685 | A1* | 3/2018 | Wu | H04W 72/0413 |
| 2018/0083666 | A1* | 3/2018 | Bayesteh | H04L 1/0041 |
| 2018/0083746 | A1* | 3/2018 | Kang | H04L 5/0007 |
| 2018/0131433 | A1* | 5/2018 | Kang | H04B 7/0663 |
| 2018/0234867 | A1* | 8/2018 | Wang | H04L 5/006 |
| 2018/0337816 | A1* | 11/2018 | Herath | H04L 1/0075 |
| 2019/0174345 | A1* | 6/2019 | Xing | H04W 24/10 |
| 2019/0181993 | A1* | 6/2019 | Lee | H04L 27/18 |
| 2019/0223208 | A1* | 7/2019 | Yoshimoto | H04L 5/0055 |
| 2019/0223225 | A1* | 7/2019 | Lee | H04L 25/03866 |
| 2019/0273576 | A1* | 9/2019 | Zhang | H04L 5/0016 |
| 2019/0289574 | A1* | 9/2019 | Li | H04W 74/006 |
| 2020/0028628 | A1* | 1/2020 | Lei | H04L 1/1819 |
| 2020/0077402 | A1* | 3/2020 | Lei | H04J 13/16 |
| 2021/0184907 | A1* | 6/2021 | Liu | H04W 24/06 |
| 2021/0297300 | A1* | 9/2021 | Zhang | H04L 1/0045 |

FOREIGN PATENT DOCUMENTS

| | | | |
|---|---|---|---|
| CN | 106941688 A | * | 7/2017 |
| CN | 106941688 A | | 7/2017 |

OTHER PUBLICATIONS

Islam et al., "Power-Domain Non-Orthogonal Multiple Access (NOMA) in 5G Systems: Potentials and Challenges", 2016, Inha University, South Korea and Memorial University, Canada, DOI: 10.1109/COMST.2016.2621116, Total pp. 41 (Year: 2016).*

Chen et al., "Pattern Division Multiple Access—A Novel Nonorthogonal Multiple Access for Fifth-Generation Radio Networks", Jul. 2016, IEEE, IEEE Transactions on Vehicular Technology ( vol. 66, Issue: 4, Apr. 2017), pp. 3185-3196, Total pp. 12 (Year: 2016).*

Benjebbour, Anass, describing "An Overview of Non-Orthogonal Multiple Access", ZTE Commun., vol. 15, No. S1, pp. 21-30, Jun. 2017 (Year: 2017).*

Wang et al., describing "Comparison Study of Non-Orthogonal Multiple Access Schemes for 5G", in Proc. IEEE Int. Symp. Broadband Multimedia Syst. Broadcast., Ghent, Belgium, Jun. 2015, pp. 1-5. (Year: 2015).*

International Search Report issued in PCT/CN2018/105028 dated Nov. 29, 2018 (2 pages).

* cited by examiner

METHOD AND APPARATUS FOR GENERATING SPREAD SYMBOLS

CROSS-REFERENCE TO RELATED APPLICATIONS

This application is a 371 U.S. National Phase of International Application No. PCT/CN2018/105028, filed on Sep. 11, 2018, which claims priority to Chinese Application No. 201710842765.3, filed on Sep. 18, 2017. The entire disclosures of the above applications are incorporated herein by reference.

TECHNICAL FIELD

The present disclosure relates to a field of wireless communication, and in particular to a method and an apparatus for generating spread symbols for a Non-Orthogonal Multiple Access (NOMA) system.

BACKGROUND

In order to improve anti-interference performance of communication systems, it has been proposed to use a spreading sequence to spread symbols in a NOMA system. In the prior art, a spreading sequence used by a user terminal or a base station is generated for a plurality of user terminals having the same average received power.

For example, one matrix may be generated with a predetermined rule according to a spreading factor of a spreading sequence for the plurality of user terminals having the same average received power, and then the user terminal or the base station selects one column from the matrix as its own spreading sequence to use. For another example, a spreading sequence may be randomly generated for the plurality of user terminals having the same average received power, and then the user terminal or the base station may use the spreading sequence.

However, in a communication system, average received powers of a plurality of user terminals are usually different. Moreover, performance parameters of the user terminal are not limited to the average received power.

SUMMARY OF THE DISCLOSURE

According to one aspect of the present disclosure, a method for generating spread symbols is provided, the method comprising: determining a spreading sequence according to a spreading sequence matrix, wherein the spreading sequence matrix is generated according to performance parameters of a plurality of user terminals; and spreading initial symbols by using the determined spreading sequence to generate spread symbols.

According to another aspect of the present disclosure, an apparatus for generating spread symbols is provided, the apparatus comprising: a processing unit configured to determine a spreading sequence for the apparatus according to a spreading sequence matrix, wherein the spreading sequence matrix is generated according to performance parameters of a plurality of user terminals; and a generating unit configured to spread initial symbols by using the determined spreading sequence to generate spread symbols.

The method and the apparatus for generating spread symbols for the NOMA system according to the above aspects of the present disclosure generate spreading sequences for a plurality of user terminals having different average received powers, and generate the spreading sequences according to Signal to Interference plus Noise Ratios (SINRs) of the plurality of user terminals, thereby minimizing interference between user terminals.

BRIEF DESCRIPTION OF THE DRAWINGS

In order to explain the technical solution of embodiments of the present disclosure more clearly, accompanying drawings used in description of the embodiments will be briefly introduced below. Obviously, the accompanying drawings in the following description are merely some of the embodiments of the present disclosure. Those skilled in the art may further obtain other accompanying drawings according to these accompanying drawings without creative effort.

DESCRIPTION OF THE EMBODIMENTS

Figure 1:
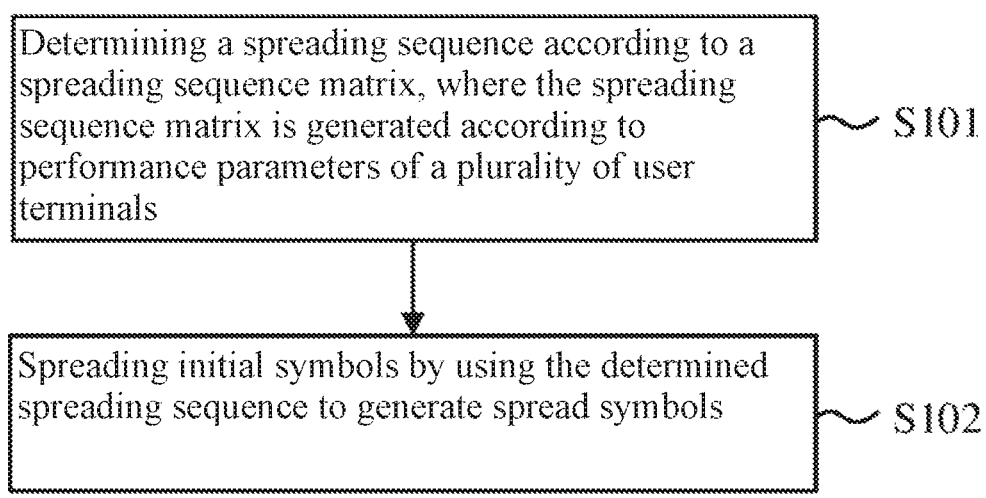
FIG. 1 shows a flowchart of a method for generating spread symbols according to one embodiment of the present disclosure.

A method and an apparatus for generating spread symbols for a NOMA system according to the embodiments of the present disclosure will be described below with reference to the accompanying drawings. Like reference numerals refer to like elements throughout the accompanying drawings. It should be understood that the embodiments described herein are merely illustrative and should not be construed as limiting the scope of the present disclosure. The method of the present disclosure may be performed by a base station or by a user terminal. Accordingly, the apparatus of the present disclosure may be a base station or a user terminal. Furthermore, the base station described herein may be a fixed station, a NodeB, an eNodeB (eNB), an access point, a transmission point, a reception point, a femto cell, a small cell or the like, which is not limited herein. Furthermore, a User Equipment (UE) described herein may include various types of user terminals, for example, a mobile terminal (or referred to as a mobile station) or a fixed terminal. However, for convenience, the UE and the mobile station sometimes may be used interchangeably hereinafter.

The method and the apparatus for generating spread symbols for a NOMA system provided according to the embodiments of the present disclosure generate spreading sequences for a plurality of user terminals having different average received powers, and generate the spreading sequences according to Signal to Interference plus Noise Ratios of the plurality of user terminals, thereby minimizing interference between user terminals.

The method for generating spread symbols according to one embodiment of the present disclosure will be described below with reference to FIG. 1. FIG. 1 shows a flowchart of the method 100 for generating spread symbols. The method 100 for generating spread symbols shown in FIG. 1 may be performed by a communication device such as a base station, a user terminal or the like. For example, the method 100 for generating spread symbols shown in FIG. 1 may be performed by a communication device in the NOMA system.

As shown in FIG. 1, in step S101, a spreading sequence is determined according to a spreading sequence matrix, where the spreading sequence matrix is generated according to performance parameters of a plurality of user terminals. In this embodiment, a spreading sequence for a communication device performing the method 100 is determined according to the spreading sequence matrix in step S101. Moreover, in this embodiment, a performance parameter may include a power parameter.

For example, the power parameter may indicate a transmission power or a received power of the communication device performing the method 100. Alternatively, the power parameter may be a Signal to Interference plus Noise Ratio (SINR) of the communication device performing the method 100. In this embodiment, when the performance parameter is a transmission power or a received power, the performance parameters may be at least partially different for the plurality of user terminals. Alternatively, when the performance parameter is a Signal to Interference plus Noise Ratio, the performance parameters may be at least partially different or the same.

According to one example of this embodiment, the communication device performing the method 100 may generate the spreading sequence matrix according to performance parameters of a plurality of user terminals. For example, when the communication device performing the method 100 is a base station, the spreading sequence matrix may be generated according to performance parameters of a plurality of user terminals that communicate with the base station.

According to another example of this embodiment, the communication device performing the method 100 may determine the spreading sequence matrix by received signaling. For example, when the communication device performing the method 100 is a user terminal, the spreading sequence matrix may be determined according to signaling received from the base station.

In this embodiment, the spreading sequence matrix used to determine the spreading sequence may also be referred to as a codebook for the spreading sequence. Alternatively, the spreading sequence matrix used to determine the spreading sequence may also be referred to as a code book, or a spreading sequence pool or a sequence pool for the spreading sequence. Accordingly, the spreading sequence determined according to the spreading sequence matrix may also be referred to as a codeword or a signature.

Furthermore, according to another example of this embodiment, the spreading sequence matrix is formed according to a first spreading sequence matrix related to a first part of user terminals of the plurality of user terminals and a second spreading sequence matrix related to a second part of user terminals of the plurality of user terminals. The first part of user terminals and the second part of user terminals may be determined according to the performance parameters, the first spreading sequence matrix may be determined according to performance parameters of the first part of user terminals, and the second spreading sequence matrix may be determined according to performance parameters of the second part of user terminals.

In this example, a part of user terminals of the plurality of user terminals may be the first part of user terminals, and the remaining user terminals may be the second part of user terminals. Alternatively, each of the plurality of user terminals may be the second part of user terminals.

Specifically, for one user terminal of the plurality of user terminals, whether the user terminal belongs to the first part of user terminals or the second part of user terminals may be determined according to a performance parameter of the user terminal and the performance parameters of the plurality of user terminals.

For example, for one user terminal of the plurality of user terminals, a first value may be generated according to a performance parameter of the user terminal, and a second value may be generated according to the performance parameters of the plurality of user terminals. Then, magnitudes of the first value and the second value are compared: when the first value is greater than the second value, the user terminal is determined as one of the first part of user terminals; when the first value is less than or equal to the second value, the user terminal is determined as one of the second part of user terminals.

According to one example of this embodiment, the first value may be equal to the performance parameter of the user terminal, or may be a value obtained by performing a mathematical operation on the performance parameter of the user terminal. The second value may be a value obtained by performing a mathematical operation on a sum of performance parameters of user terminals among other user terminals and having performance parameters smaller than the performance parameter of the user terminal, a spreading factor of the spreading sequence, and the number of user terminals among the plurality of user terminals (i.e., all user terminals) having performance parameters larger than or equal to the performance parameter of the user terminal.

For example, assuming that the performance parameters are average received powers of user terminals, the number of the plurality of user terminals is K, average received powers of the K user terminals are $\{P_1, \ldots, P_i, \ldots, P_K\}$, respectively, and the spreading factor is N, where K is a positive integer, i is a positive integer, and $1 \leq i \leq K$. For the i-th user terminal, the first value $P_i$ is generated according to the average received power $P_i$ of the i-th user terminal, and according to the average received powers $\{P_1, \ldots, P_i, \ldots, P_K\}$ of all user terminals, the second value is generated as:

$$\frac{\sum_{j=1}^{K} P_j 1_{\{P_i > P_j\}}}{N - \sum_{j=1}^{K} 1_{\{P_j \geq P_i\}}}$$

In this second value, the physical meaning of $\sum_{j=1}^{K} P_j 1_{\{P_i > P_j\}}$ refers to a sum of average received powers among the average received powers $\{P_1, \ldots, P_i, \ldots, P_K\}$ of all user terminals that are smaller than $P_i$, the physical meaning of $N - \sum_{j=1}^{K} 1_{\{P_j \geq P_i\}}$ refers to a difference between the spreading factor N and the number of user terminals whose average received powers among the average received powers $\{P_1, \ldots, P_i, \ldots, P_K\}$ of all user terminals are greater than or equal to $P_i$. Then, magnitudes of $P_i$ and $$\frac{\sum_{j=1}^{K} P_j 1_{\{P_i > P_j\}}}{N - \sum_{j=1}^{K} 1_{\{P_j \geq P_i\}}}$$

are compared: when $$P_i > \frac{\sum_{j=1}^{K} P_j 1_{\{P_i > P_j\}}}{N - \sum_{j=1}^{K} 1_{\{P_j \geq P_i\}}},$$

the i-th user terminal is determined as one of the first part of user terminals; when $$P_i \leq \frac{\sum_{j=1}^{K} P_j 1_{\{P_i > P_j\}}}{N - \sum_{j=1}^{K} 1_{\{P_j \geq P_i\}}},$$

the i-th user terminal is determined as one of the second part of user terminals.

As another example, assuming that the performance parameters are SINRs of user terminals, and the number of the plurality of user terminals is K, SINRs of the K user terminals are $\{\beta_1, \ldots \beta_i, \ldots \beta_K\}$, respectively, and the spreading factor is N, where K is a positive integer, i is a positive integer, and $1 \leq i \leq K$. For the i-th user terminal, the first value $$e_i = \frac{\beta_i}{1 + \beta_i}$$

is generated according to the SINR $\beta_i$ of the i-th user terminal, and according to the SINRs $\{\beta_1, \ldots, \beta_i, \ldots, \beta_K\}$ of all user terminals, the second value is generated as:

$$\frac{\sum_{j=1}^{K} e_j 1_{\{e_i > e_j\}}}{N - \sum_{j=1}^{K} 1_{\{e_j \geq e_i\}}}$$

In this second value, the physical meaning of $\Sigma_{j=1}^{K} e_j 1_{\{e_i > e_j\}}$ refers to a sum of first values among the first values of all user terminals that are smaller than $e_i$, the physical meaning of $N - \Sigma_{j=1}^{K} 1_{\{e_j \geq e_i\}}$ refers to a difference between the spreading factor N and the number of user terminals whose first values among the first values of all user terminals are greater than or equal to $e_i$. Then, magnitudes of $e_i$ and $$\frac{\sum_{j=1}^{K} e_j 1_{\{e_i > e_j\}}}{N - \sum_{j=1}^{K} 1_{\{e_j \geq e_i\}}}$$

are compared: when $$e_i > \frac{\sum_{j=1}^{K} e_j 1_{\{e_i > e_j\}}}{N - \sum_{j=1}^{K} 1_{\{e_j \geq e_i\}}},$$

the i-th user terminal is determined as one of the first part of user terminals; when $$e_i \leq \frac{\sum_{j=1}^{K} e_j 1_{\{e_i > e_j\}}}{N - \sum_{j=1}^{K} 1_{\{e_j \geq e_i\}}},$$

the i-th user terminal is determined as one of the second part of user terminals.

In this example, the SINRs of the K user terminals may satisfy a condition of $\beta_1 \geq \ldots \geq \beta_K$. Certainly, the SINRs of the K user terminals may also satisfy other restrictive conditions, which is not limited in the present disclosure.

Furthermore, the first part of user terminals and the second part of user terminals may also have more specific names. For example, assuming that the performance parameters are average received powers of user terminals, the first part of user terminals may be referred to as oversized user terminals, and the second part of user terminals may be referred to as non-oversized user terminals. As another example, when the performance parameters are SINRs of user terminals, the first part of user terminals may be referred to as overloading user terminals, and the second part of user terminals may be referred to as non-overloading user terminals.

Then, the first spreading sequence matrix may be generated according to the performance parameters of the first part of user terminals. For example, assuming that m user terminals are determined as the first part of user terminals, (K−m) user terminals are determined as the second part of user terminals, where m is a positive integer and $1 \leq m \leq (N-1)$, and then the first spreading sequence matrix may be generated according to performance parameters of the m user terminals.

Specifically, for example, assuming that the performance parameters are average received powers of user terminals or SINRs of user terminals, the spreading factor N is equal to 4 (N=4), the number of the plurality of user terminals K is equal to 6 (K=6), the first and second user terminals are determined as the first part of user terminals (i.e., m=2), and the third, fourth, fifth, and sixth user terminals are determined as the second part of user terminals (i.e., (K−m)=4). Then, according to performance parameters of the first and second user terminals, a 2×2 identity matrix $I_2$ may be generated as:

$$\begin{bmatrix} 1 & 0 \\ 0 & 1 \end{bmatrix}$$

That is, the first spreading sequence matrix is a 2×2 identity matrix $I_2$. The first column of the first spreading sequence matrix corresponds to the first user terminal, and the second column corresponds to the second user terminal.

Furthermore, assuming that the performance parameters are SINRs of user terminals, a transmission power may also be determined according to a power matrix, where the power matrix is generated according to a first power matrix and a second power matrix. The first power matrix is generated according to the performance parameters of the first part of user terminals and a noise parameter of a communication system including the plurality of user terminals. The second power matrix is generated according to the performance parameters of the second part of user terminals and the noise parameter of the communication system including the plurality of user terminals. Then, the spread symbols may be transmitted by using the determined transmission power in a later step S102. The second power matrix will be described in detail hereinafter, and the first power matrix will be described herein firstly.

For example, in the above-described example of "assuming that the performance parameters are average received powers of user terminals or SINRs of user terminals, the spreading factor N is equal to 4 (N=4), and the number of the plurality of user terminals K is equal to 6 (K=6)", received powers of the first and the second user terminals may be determined as $P_1$ and $P_2$, respectively, according to SINRs of the first and second user terminal and the noise (e.g., Gaussian white noise) parameter of the communication system including the plurality of user terminals in accordance with the following equation (1):

$$P_i = \sigma^2 \beta_i \quad \text{Equation (1)}$$

In equation (1), $\sigma^2$ refers to the variance of the Gaussian white noise. Then, according to the received powers $P_1$ and $P_2$ of the first and second user terminals, the first power matrix may be generated as $\text{diag}\{\sigma^2 \beta_i\}_{1 \leq i \leq m}$.

Then, the second spreading sequence matrix may be generated according to the performance parameters of the second part of user terminals. For example, assuming that m user terminals are determined as the first part of user terminals, and (K−m) user terminals are determined as the second part of user terminals, then, the second spreading sequence matrix may be generated according to performance parameters of the (K−m) user terminals.

Specifically, assuming that the performance parameters are average received powers of user terminals, the second spreading sequence matrix may be generated according to the average received powers of the second part of user terminals and a system capacity parameter of the communication system including the plurality of user terminals. Alternatively, assuming that the performance parameters are SINRs of user terminals, the second spreading sequence matrix may be generated according to the SINRs of the second part of user terminals and a system power parameter of the communication system including the plurality of user terminals.

Hereinafter, assuming that the performance parameters are average received powers of user terminals, how to generate the second spreading sequence matrix according to the average received powers of the second part of user terminals and the system capacity parameter of the communication system including the plurality of user terminals will be described.

A matrix Q may be constructed firstly according to the average received powers of the second part of user terminals and the system capacity parameter of the communication system including the plurality of user terminals. An example of constructing the matrix Q will be given herein.

In this example, the system capacity parameter may be a channel capacity C. The channel capacity C may be obtained by the following equation (2):

$$C(S) = \log_2\left[\det\left(I + \frac{1}{\sigma^2} SDS^H\right)\right] \quad \text{Equation (2)}$$

In equation (2), I is an identity matrix, S is a spreading sequence matrix corresponding to the plurality of user terminals, D is a diagonal matrix $\text{diag}\{P_1, \ldots, P_i, \ldots, P_K\}$ generated according to the average received powers of the plurality of user terminals, and $S^H$ is the conjugate transposed matrix of the matrix S.

After formula derivation, the above equation (2) may be transformed into the following equation (3):

$$C(S) = \sum_{n=1}^{N} \log_2\left(1 + \frac{1}{\sigma^2} \lambda_n(S)\right) \quad \text{Equation (3)}$$

In equation (3), $\lambda_n(S)$ is an eigenvalue of the matrix $SDS^H$, n is a positive integer and $1 \leq n \leq N$. Therefore, when the channel capacity C achieves an optimal value under the constraint condition as shown in the following equation (4), values of $\lambda_n(S)$ and C(S) are as shown in the following equations (5A) and (5B):

$$\sum_{i=1}^{K} P_i = \sum_{n=1}^{N} \lambda_n(S) \quad \text{Equation (4)}$$

$$\lambda^*(S) = \quad \text{Equation (5A)}$$
$$\left(\underbrace{\frac{\sum_{(m+1) \leq j \leq K} P_j}{N-m}, \ldots, \frac{\sum_{(m+1) \leq j \leq K} P_j}{N-m}}_{} \; P_i; 1 \leq i \leq m\right)$$

$$C^*(S) = \underbrace{\sum_{i=1}^{m} \log_2\left(1 + \frac{P_i}{\sigma^2}\right)}_{\text{System capacity of the first part of user terminals}} + \quad \text{Equation (5B)}$$

$$\underbrace{(N-m)\log_2\left(1 + \frac{1}{\sigma^2}\sum_{(m+1) \leq j \leq K} P_j\right)}_{\text{System capacity of the second part of user terminals}}$$

Then, an eigenvalue matrix Λ related to the second part of user terminals is determined according to $\lambda^*(S)$, and Λ is a diagonal matrix as shown in the following equation (6):

$$\Lambda = \text{diag}\left(\underbrace{\frac{\sum_{(m+1) \leq j \leq K} P_j}{N-m}, \ldots, \frac{\sum_{(m+1) \leq j \leq K} P_j}{N-m}}_{(N-m) \text{ same elements}}, \underbrace{0, \ldots, 0}_{(K-N) \text{ zero elements}}\right) \quad \text{Equation (6)}$$

In the eigenvalue matrix Λ, the number of elements with a value of 0 on the diagonal is equal to (K−N).

The matrix Q may then be constructed according to the eigenvalue matrix Λ and the diagonal elements $\{P_j|(m+1) \leq j \leq K\}$. Herein, the constructed matrix Q is not unique.

After the matrix Q is constructed, the constructed matrix Q is decomposed to obtain an eigenvector matrix U, as shown in the following equation (7):

$$Q = U \Lambda U^H \quad \text{Equation (7)}$$

In equation (7), $U^H$ is the conjugate transposed matrix of the eigenvector matrix U.

After the eigenvector matrix U is obtained, column vectors whose corresponding eigenvalues are not zero are selected from the eigenvector matrix U to obtain a modified eigenvector matrix $\tilde{U}$, and non-zero eigenvalues are selected from the eigenvalue matrix $\Lambda$ to form a diagonal matrix as a modified eigenvalue matrix $\tilde{\Lambda}$.

Then, a power matrix $\tilde{D}$ of the second part of user terminals is determined, and the power matrix $\tilde{D}$ is a diagonal matrix $\text{diag}(P_j|(m+1) \leq j \leq K)$. Then, according to the modified eigenvector matrix $\tilde{U}$, the modified eigenvalue matrix $\tilde{\Lambda}$ and the power matrix $\tilde{D}$, the second spreading sequence matrix $S_{non}$ is generated in accordance with the following equation (8):

$$S_{non} = \tilde{\Lambda}^{\frac{1}{2}} \tilde{U}^H \tilde{D}^{-\frac{1}{2}} \qquad \text{Equation (8)}$$

In equation (8), $$\tilde{\Lambda}^{\frac{1}{2}}$$

represents performing an arithmetic square root operation on elements in the eigenvalue matrix $\tilde{\Lambda}$, $$\tilde{D}^{-\frac{1}{2}}$$

represents performing an arithmetic square root operation on elements in a matrix obtained by performing an inverse operation on the power matrix $\tilde{D}$, and $\tilde{U}^H$ represents the conjugate transposed matrix of the matrix $\tilde{U}$.

So far, the specific process of generating the second spreading sequence matrix according to the average received powers of the second part of user terminals and the system capacity parameter of the communication system including the plurality of user terminals under the assumption that the performance parameters are average received powers of user terminals has been described. In order to describe the variety of matrices involved in the above specific process more clearly, the variety of matrices involved in the above specific process will be explained herein with the above-described example of "assuming that the performance parameters are average received powers of user terminals or SINRs of user terminals, the spreading factor N is equal to 4 (N=4), and the number of the plurality of user terminals K is equal to 6 (K=6)".

Specifically, in the example of "assuming that the performance parameters are average received powers of user terminals or SINRs of user terminals, the spreading factor N is equal to 4 (N=4), and the number of the plurality of user terminals K is equal to 6 (K=6)", the matrix Q may be constructed firstly according to average received powers of the third, fourth, fifth, and sixth user terminals and the system capacity parameter.

In this example, the channel capacity C is as shown in the above equation (2), where I is a 4×4 identity matrix, S is a 4×6 matrix, and D is a 6×6 diagonal matrix $\text{diag}\{P_1, P_2, P_3, P_4, P_5, P_6\}$ generated from average received powers of 6 user terminals.

After formula derivation, when the channel capacity C achieves the optimal value under the constraint as shown in the above equation (4), the value of $\lambda_n(S)$ is:

$$\lambda^*(S) = \left( \frac{P_3 + P_4 + P_5 + P_6}{2}, \frac{P_3 + P_4 + P_5 + P_6}{2}, P_1, P_2 \right).$$

Then, the eigenvalue matrix $\Lambda$ related to the second part of user terminals is determined according to $\lambda^*(S)$, and the eigenvalue matrix $\Lambda$ is a 4×4 diagonal matrix $$\text{diag}\left( \frac{P_3 + P_4 + P_5 + P_6}{2}, \frac{P_3 + P_4 + P_5 + P_6}{2}, 0, 0 \right).$$

Then, the matrix Q is constructed according to the eigenvalue matrix $\Lambda$ and the diagonal elements $\{P_3, P_4, P_5, P_6\}$, and the matrix Q is a 4×4 matrix. After the matrix Q is constructed, the matrix Q is decomposed to obtain the eigenvector matrix U, which is a 4×4 matrix.

Then, column vectors of the first column and the second column are selected from the eigenvector matrix U to generate the modified eigenvector matrix $\tilde{U}$, which is a 4×2 matrix. Non-zero eigenvalues of the eigenvalue matrix $\Lambda$ are used as diagonal elements to generate the modified eigenvalue matrix $$\tilde{\Lambda} = \text{diag}\left( \frac{P_3 + P_4 + P_5 + P_6}{2}, \frac{P_3 + P_4 + P_5 + P_6}{2} \right).$$

Then, the power matrix for the second part of user terminals is determined as $\tilde{D} = \text{diag}\{P_3, P_4, P_5, P_6\}$, which is a 4×4 diagonal matrix.

Finally, in accordance with the above equation (8), the second spreading sequence matrix $S_{non}$ is generated according to the modified eigenvector matrix $\tilde{U}$, the modified eigenvalue matrix $\tilde{\Lambda}$ and the power matrix $\tilde{D}$, where $S_{non}$ is a 2×4 matrix. The first column of the $S_{non}$ corresponds to the third user terminal, the second column of the Sn corresponds to the fourth user terminal, the third column of the $S_{non}$ corresponds to the fifth user terminal, and the fourth column of the $S_{non}$ corresponds to the sixth user terminal.

It has been described above that how to generate the second spreading sequence matrix according to the average received powers of the second part of user terminals and the system capacity parameter of the communication system including the plurality of user terminals under the assumption that the performance parameters are average received powers of user terminals. How to generate the second spreading sequence matrix according to the SINRs of the second part of user terminals and the system power parameter of the communication system including the plurality of user terminals under the assumption that the performance parameters are SINRs of user terminals will be described below.

A matrix Q may be constructed firstly according to the SINRs of the second part of user terminals and the system power parameter of the communication system including the plurality of user terminals. An example of constructing the matrix Q will be given herein.

In this example, SINR of each user terminal may be expressed as the following equation (9), which after formula derivation, may be expressed as the following equation (10):

$$\beta_i = P_i s_i^H Z_i^{-1} s_i \qquad \text{Equation (9)}$$

$$\beta_i = \frac{P_i s_i^H Z^{-1} s_i}{1 - P_i s_i^H Z^{-1} s_i} \qquad \text{Equation (10)}$$

In equation (9) and equation (10), $P_i$ is the average received power of the i-th user terminal, $s_i$ is the i-th column vector of the spreading sequence matrix S corresponding to the plurality of user terminals, $s_i^H$ is the conjugate transposed vector of $s_i$, $Z_i = SDS^H - P_i s_i s_i^H + \sigma^2 I$, matrix $Z = SDS^H + \sigma^2 I$, $Z_i^{-1}$ is obtained by performing an inverse operation on $$Z_i, \quad P_i s_i^H Z^{-1} s_i = \frac{\beta_i}{1+\beta_i},$$

and D is a diagonal matrix $\text{diag}\{P_1, \ldots, P_i, \ldots, P_K\}$ generated according to the average received powers of plurality of user terminals.

Then, the matrix Q is defined in accordance with the following equation (11):

$$Q \triangleq D^{\frac{1}{2}} S^H (SDS^H + \sigma^2 I)^{-1} S D^{\frac{1}{2}} \qquad \text{Equation (11)}$$

For the matrix Q defined by equation (11), its diagonal elements are $\{P_i s_i^H Z^{-1} s_i\}$, and its eigenvalues are $$\left\{ \frac{\lambda_n(S)}{\lambda_n(S) + \sigma^2} \right\},$$

where $\lambda_n(S)$ is an eigenvalue of the matrix $SDS^H$.

In this example, the system power parameter may be the sum of the average received powers of all user terminals, that is, $\sum_{i=1}^{K} P_i$. When the system power parameter achieves a minimum value under the constraint condition as shown in the following equation (12), eigenvalues $\lambda_n(Q)$ of the matrix Q are as shown in the following equation (13), where n is a positive integer and $1 \le n \le N$:

$$\frac{P_i s_i^H Z^{-1} s_i}{1 - P_i s_i^H Z^{-1} s_i} \ge \beta_i \qquad \text{Equation (12)}$$

$$\lambda^*(Q) = \left( \frac{1}{N-m} \sum_{(m+1) \le j \le K} \frac{\beta_j}{1+\beta_j}, \ldots, \right.$$
$$\left. \frac{1}{N-m} \sum_{(m+1) \le j \le K} \frac{\beta_j}{1+\beta_j}, \frac{\beta_i}{1+\beta_i}; 1 \le i \le m \right) \qquad \text{Equation (13)}$$

Then, an eigenvalue matrix V related to the second part of user terminals is determined according to $\lambda^*(Q)$, and V is a diagonal matrix as shown in the following equation (14):

$$V = \text{diag}\left( \underbrace{\frac{1}{N-m} \sum_{(m+1) \le j \le K} \frac{\beta_j}{1+\beta_j}, \ldots, \frac{1}{N-m} \sum_{(m+1) \le j \le K} \frac{\beta_j}{1+\beta_j}}_{(N-m)\text{same elements}}, \underbrace{0, \ldots, 0}_{(K-N)\text{zero}} \right) \qquad \text{Equation (14)}$$

In the eigenvalue matrix V, the number of elements with a value of 0 on the diagonal is equal to (K−N).

Then, a matrix $Q_{non}$ may be constructed according to the eigenvalue matrix V and the diagonal elements $$\left\{ \frac{\beta_j}{1+\beta_j} \middle| (m+1) \le j \le K \right\}.$$

Herein, the constructed $Q_{non}$ is not unique.

After the matrix $Q_{non}$ is constructed, the constructed matrix $Q_{non}$ is decomposed to obtain an eigenvector matrix U, as shown in the following equation (15):

$$Q_{non} = U V U^H \qquad \text{Equation (15)}$$

In equation (15), $U^H$ is the conjugate transposed matrix of the eigenvector matrix U.

Then, a diagonal matrix $\Lambda$ is determined, as shown in the following equation (16):

$$\Lambda = \text{diag}\left\{ \left(1 - \frac{1}{N-m} \sum_{j=m+1}^{K} \frac{\beta_j}{1+\beta_j}\right)^{-1} - \sigma^2, \ldots, \right. \qquad \text{Equation (16)}$$
$$\left. \left(1 - \frac{1}{N-m} \sum_{j=m+1}^{K} \frac{\beta_j}{1+\beta_j}\right)^{-1} - \sigma^2, 0, \ldots, 0 \right\}$$

Then, according to the eigenvector matrix U and the diagonal matrix $\Lambda$, a second power matrix $D_{non}$ is generated in accordance with the following equation (17):

$$D_{non} = \text{diag}(U \Lambda U^H) \qquad \text{Equation (17)}$$

where $\text{diag}(U \Lambda U^H)$ represents a diagonal matrix formed by diagonal elements of the matrix $U \Lambda U^H$.

Then, column vectors whose corresponding eigenvalues are not zero are selected from the eigenvector matrix U to generate a modified eigenvector matrix $\tilde{U}$, and non-zero eigenvalues are selected from the eigenvalue matrix $\Lambda$ to form a diagonal matrix as a modified eigenvalue matrix $\tilde{\Lambda}$.

Then, according to the modified eigenvector matrix $\tilde{U}$, the modified eigenvalue matrix $\tilde{\Lambda}$ and the second power matrix $D_{non}$, the second spreading sequence matrix $S_{non}$ is generated in accordance with the following equation (18):

$$S_{non} = \tilde{\Lambda}^{\frac{1}{2}} \tilde{U}^H D_{non}^{-\frac{1}{2}} \qquad \text{Equation (18)}$$

In equation (18), $$\tilde{\Lambda}^{\frac{1}{2}}$$

represents performing an arithmetic square root operation on the elements in the diagonal matrix $\tilde{\Lambda}$, $\tilde{U}^H$ represents the conjugate transposed matrix of the matrix $\tilde{U}$, and $$D_{non}^{-\frac{1}{2}}$$

represents performing an arithmetic square root operation on elements in a matrix obtained by performing an inverse operation on the power matrix $D_{non}$.

So far, the specific process of generating the second spreading sequence matrix according to the SINRs of the second part of user terminals and the system power parameter of the communication system including the plurality of user terminals under the assumption that the performance parameters are SINRs s of user terminals has been described. In order to describe the variety of matrices involved in the above specific process more clearly, the variety of matrices involved in the above specific process will be explained herein with the above-described example of "assuming that the performance parameters are average received powers of user terminals or SINRs of user terminals, the spreading factor N is equal to 4 (N=4), and the number of the plurality of user terminals K is equal to 6 (K=6)".

Specifically, in the example of "assuming that the performance parameters are average received powers of user terminals or SINRs of user terminals, the spreading factor N is equal to 4 (N=4), and the number of the plurality of user terminals K is equal to 6 (K=6)", the matrix Q may be constructed firstly according to the SINRs of the third, fourth, fifth, and sixth user terminals and the system power parameter.

In this example, the defined matrix Q is as shown in the above equation (11), where I is a 4×4 identity matrix, S is a 4×6 matrix, and D is a 6×6 diagonal matrix diag$\{P_1, P_2, P_3, P_4, P_5, P_6\}$ generated from the average received powers of 6 user terminals.

After formula derivation, when the system power parameter achieves an optimal value under the constraint as shown in the above equation (12), the value of $\lambda_n(Q)$ is:

$$\lambda^*(Q) = \left( \frac{\frac{\beta_3}{1+\beta_3} + \frac{\beta_4}{1+\beta_4} + \frac{\beta_5}{1+\beta_5} + \frac{\beta_6}{1+\beta_6}}{2}, \right.$$

$$\left. \frac{\frac{\beta_3}{1+\beta_3} + \frac{\beta_4}{1+\beta_4} + \frac{\beta_5}{1+\beta_5} + \frac{\beta_6}{1+\beta_6}}{2}, \frac{\beta_1}{1+\beta_1}, \frac{\beta_2}{1+\beta_2} \right).$$

Then, the eigenvalue matrix V related to the second part of user terminals is determined according to $\lambda^*(Q)$, and the eigenvalue matrix V is a 4×4 diagonal matrix $$\text{diag}\left( \frac{\frac{\beta_3}{1+\beta_3} + \frac{\beta_4}{1+\beta_4} + \frac{\beta_5}{1+\beta_5} + \frac{\beta_6}{1+\beta_6}}{2}, \right.$$

$$\left. \frac{\frac{\beta_3}{1+\beta_3} + \frac{\beta_4}{1+\beta_4} + \frac{\beta_5}{1+\beta_5} + \frac{\beta_6}{1+\beta_6}}{2}, 0, 0 \right).$$

Then, the matrix $Q_{non}$ is constructed according to the eigenvalue matrix V and the diagonal elements $$\left\{ \frac{\beta_3}{1+\beta_3}, \frac{\beta_4}{1+\beta_4}, \frac{\beta_5}{1+\beta_5}, \frac{\beta_6}{1+\beta_6} \right\},$$

and the matrix $Q_{non}$ is a 4×4 matrix. After the matrix $Q_{non}$ is constructed, the matrix $Q_{non}$ is decomposed to obtain the eigenvector matrix U, which is a 4×4 matrix.

Then, the diagonal matrix $$\Lambda = \text{diag}\left\{ \left(1 - \frac{1}{2}\sum_{j=3}^{6} \frac{\beta_j}{1+\beta_j}\right)^{-1} - \sigma^2, \left(1 - \frac{1}{2}\sum_{j=3}^{6} \frac{\beta_j}{1+\beta_j}\right)^{-1} - \sigma^2, 0, 0 \right\}$$

is determined, which is a 4×4 diagonal matrix.

Then, in accordance with the above equation (17), the second power matrix $D_{non}$ is generated according to the eigenvector matrix U and the diagonal matrix $\Lambda$, and the $D_{non}$ is a 4×4 matrix.

Then, column vectors of the first column and the second column are selected from the eigenvector matrix U to generate the modified eigenvector matrix $\tilde{U}$, which is a 4×2 matrix. Non-zero eigenvalues of the eigenvalue matrix $\Lambda$ are used as diagonal elements to generate the modified eigenvalue matrix $$\tilde{\Lambda} = \text{diag}\left\{ \left(1 - \frac{1}{2}\sum_{j=3}^{6} \frac{\beta_j}{1+\beta_j}\right)^{-1} - \sigma^2, \left(1 - \frac{1}{2}\sum_{j=3}^{6} \frac{\beta_j}{1+\beta_j}\right)^{-1} - \sigma^2 \right\}.$$

Then, in accordance with the above equation (18), the second spreading sequence matrix $S_{non}$ is generated according to the modified eigenvector matrix $\tilde{U}$, the modified eigenvalue matrix $\tilde{\Lambda}$ and the second power matrix $D_{non}$, where $S_{non}$ is a 2×4 matrix. The first column of the $S_{non}$ corresponds to the third user terminal, the second column of the $S_{non}$ corresponds to the fourth user terminal, the third column of the $S_{non}$ corresponds to the fifth user terminal, and the fourth column of the $S_{non}$ corresponds to the sixth user terminal.

In addition, after the first part of user terminals and the second part of user terminals are determined according to the performance parameters, the first spreading sequence matrix may be generated according to the performance parameters of the first part of user terminals, and, simultaneously, the second spreading sequence matrix may be generated according to the performance parameters of the second part of user terminals.

Then, the spreading sequence matrix may be generated according to the first spreading sequence matrix and the second spreading sequence matrix. For example, assuming that m user terminals are determined as the first part of user terminals, and (K−m) user terminals are determined as the second part of user terminals, where m is a positive integer and $1 \leq m \leq (N-1)$, the first spreading sequence matrix may be generated according to performance parameters of the m user terminals, and the second spreading sequence matrix may be generated according to performance parameters of the (K−m) user terminals. Then, the spreading sequence matrix may be generated according to the first spreading sequence matrix and the second spreading sequence matrix.

Specifically, for example, in the above-described example of "assuming that the performance parameters are the average received powers of the user terminals or SINRs of user terminals, the spreading factor N is equal to 4 (N=4), and the number of the plurality of user terminals K is equal to 6 (K=6)", the first spreading sequence matrix $I_2$ may be generated according to the performance parameters of the first and second user terminals, and the second spreading sequence matrix $S_{non}$ may be generated according to the performance parameters of the third, fourth, fifth, and sixth user terminals. Then, the spreading sequence matrix S may be generated according to the first spreading sequence matrix $I_2$ and the second spreading sequence matrix $S_{non}$, as shown in the following equation (19):

$$S = \begin{bmatrix} I_2 & 0 \\ 0 & S_{non} \end{bmatrix} \quad \text{Equation (19)}$$

The spreading sequence matrix S is a 4×6 matrix, and the first column corresponds to the first user terminal, the second column corresponds to the second user terminal, the third column corresponds to the third user terminal, the fourth column corresponds to the fourth user terminal, the fifth column corresponds to the fifth user terminal, and the sixth column corresponds to the sixth user terminal.

The example of determining the spreading sequence matrix S with the first and second user terminals of the plurality of user terminals as the first part of user terminals, and the third, fourth, fifth, and sixth user terminals of the plurality of user terminals as the second part of user terminals has been described above. Alternatively, when each of the plurality of user terminals belongs to a second part of user terminals, that is, the first, second, third, fourth, fifth, and sixth user terminals all belong to the second part of user terminals, the spreading sequence matrix S may be determined simply according to $S_{non}$.

Furthermore, as described above, assuming that the performance parameters are SINRs of user terminals, the transmission power may further be determined according to the power matrix, where the power matrix is generated according to the first power matrix and the second power matrix. The first power matrix is generated according to the performance parameters of the first part of user terminals and the noise parameter of the communication system including the plurality of user terminals, and the second power matrix is generated according to the performance parameters of the second part of user terminals and the noise parameter of the communication system including the plurality of user terminals.

For example, in the above-described example of "assuming that the performance parameters are average received powers of user terminals or SINRs of user terminals, the spreading factor N is equal to 4 (N=4), and the number of the plurality of user terminals K is equal to 6 (K=6)", the first power matrix $\text{diag}\{\sigma^2 \beta_i\}_{1 \leq i \leq m}$ may be generated according to the SINRs of the first and second user terminals and the Gaussian white noise parameter, and the second power matrix $D_{non}$ may be generated according to the SINRs of the third, fourth, fifth and sixth user terminals and the Gaussian white noise parameter. Then, the power matrix P may be generated according to the first power matrix $\text{diag}\{\sigma^2 \beta_i\}_{1 \leq i \leq m}$ and the second power matrix $D_{non}$, as shown in the following equation (20):

$$P = \begin{bmatrix} \text{diag}\{\sigma^2 \beta_i\}_{1 \leq i \leq m} & 0 \\ 0 & D_{non} \end{bmatrix} \quad \text{Equation (20)}$$

Then, a transmission power of the first user terminal is determined according to the first diagonal element of the power matrix P, a transmission power of the second user terminal is determined according to the second diagonal element of the power matrix P, a transmission power of the third user terminal is determined according to the third diagonal element of the power matrix P, a transmission power of the fourth user terminal is determined according to the fourth diagonal element of the power matrix P, a transmission power of the fifth user terminal is determined according to the fifth diagonal element of the power matrix P, and a transmission power of the sixth user terminal is determined according to the sixth diagonal element of the power matrix P.

The example of determining the power matrix P with the first and second user terminals of the plurality of user terminals as the first part of user terminals, and the third, fourth, fifth, and sixth user terminals of the plurality of user terminals as the second part of user terminals has been described above. Alternatively, when each of the plurality of user terminals belongs to the second part of user terminals, that is, the first, second, third, fourth, fifth, and sixth user terminals all belong to the second part of user terminals, the power matrix P may be determined simply according to $D_{non}$.

Furthermore, when the communication device performing the method 100 is a base station, the base station may perform the process described above. For example, the base station may determine the first part of user terminals and the second part of user terminals according to the performance parameters, generate the first spreading sequence matrix according to the performance parameters of the first part of user terminals, generate the second spreading sequence matrix according to the performance parameters of the second part of user terminals, and generate the spreading sequence matrix according to the first spreading sequence matrix and the second spreading sequence matrix.

As another example, for one user terminal of the plurality of user terminals, the base station may determine whether the user terminal belongs to the first part of user terminals or the second part of user terminals according to a performance parameter of the user terminal and performance parameters of other user terminals than this user terminal among the plurality of user terminals.

As yet another example, the base station may generate the second spreading sequence matrix according to the performance parameters of the second part of user terminals and the system capacity parameter of the communication system including the plurality of user terminals. Alternatively, the base station may also generate the second spreading sequence matrix according to the performance parameters of the second part of user terminals and the system power parameter of the communication system including the plurality of user terminals.

As yet another example, the base station may generate the power matrix according to the first power matrix and the second power matrix, generate the first power matrix according to the performance parameters of the first part of user terminals and the noise parameter of the communication system including the plurality of user terminals, and generate the second power matrix according to the performance parameters of the second part of user terminals and the noise parameter of the communication system including the plurality of user terminals.

Furthermore, according to another example of this embodiment, when the communication device performing the method 100 is a user terminal, in grant-free uplinks of the NOMA system, the user terminal may randomly select one column from the spreading sequence matrix as the spreading sequence; while in grant-based uplinks of the NOMA system, the user terminal may receive indication information from the base station, and select one column from the spreading sequence matrix as the spreading sequence according to the indication information.

In addition, according to another example of this embodiment, the spreading sequence matrix according to which the spreading sequence is determined in step S101 may be a matrix generated by multiplying a unit orthogonal matrix and the spreading sequence matrix. Specifically, after the spreading sequence matrix S is generated in step S101, a unit orthogonal matrix having the same dimension as the first dimension (i.e., the number of rows) of the spreading sequence matrix S may be determined, and then the unit orthogonal matrix is multiplied with the spreading sequence matrix S to obtain another spreading sequence matrix $S_{orth}$.

In this example, after the spreading sequence matrix $S_{orth}$ is obtained, the spreading sequence matrix $S_{orth}$ may further be quantized. For example, elements in the spreading sequence matrix $S_{orth}$ may be mapped on a complex plane coordinate system. Then, for each element, coordinates closest to the element are determined, and the element is quantized to the value represented by the coordinates. For example, the real and imaginary parts of the value represented by the coordinates may be $\{0, \pm1\}$, $\{0, \pm1, \pm2\}$, $\{0, 1, \pm2, \pm3\}$, and so on.

As another example, the elements in the spreading sequence matrix $S_{orth}$ may also be mapped on a constellation map in the prior art. Then, for each element, the constellation point closest to the element is determined, and the element is quantized to the value represented by the constellation point. For example, the real and imaginary parts of the value represented by the constellation point may be $\{\pm1\}$, $\{1, \pm3\}$, $\{\pm1, \pm3, \pm5, \pm7\}$, and so on.

Alternatively, the constellation map in the prior art may also be modified. For example, the constellation map in the prior art is expanded to include the origin point $\{0\}$, and then the elements in the spreading sequence matrix $S_{orth}$ are mapped on the modified constellation map including the origin point 101. Then, for each element, the constellation point or the origin point closest to the element is determined, and the element is quantized to the value represented by the constellation point or the origin point.

In this example, before mapping the spreading sequence matrix $S_{orth}$ on the complex plane coordinate system or the constellation map, the elements in the spreading sequence matrix $S_{orth}$ may be expanded synchronously to further improve quantization accuracy.

An example of mapping the elements in the spreading sequence matrix $S_{orth}$ to the modified constellation map 9-QAM including the origin point $\{0\}$ for quantization is given below. For example, in step S101, the spreading sequence matrix $S_{orth}$ is obtained as:

$$\begin{bmatrix} -0.5 & -0.1640+0.2852i & 0.1656+0.2391i & 0.5960+0.4031i & -0.0952+0.3920i & -0.0457-0.6121i \\ 0.5 & -0.4467-0.5525i & 0.3550-0.0918i & 0.4346+0.0003i & -0.5470+0.2171i & -0.2100+0.1772i \\ -0.5 & -0.1978-0.4058i & -0.5979+0.2685i & 0.5127-0.0752i & 0.1879-0.1488i & 0.0411+0.5376i \\ 0.5 & 0.0406-0.4261i & -0.4234+0.4149i & -0.0712-0.1406i & 0.4590+0.4720i & 0.0468-0.5049i \end{bmatrix}$$

The elements in the spreading sequence matrix $S_{orth}$ may be mapped on the modified constellation map 9-QAM for quantization, and then a quantized spreading sequence matrix $S_{quan}$ is obtained:

$$\begin{bmatrix} -1 & i & i & 1+i & i & -i \\ 1 & -1-i & 1 & 1 & -1+i & -1 \\ -1 & -i & -1+i & 1 & 0 & i \\ 1 & -i & -1+i & 0 & 1+i & -i \end{bmatrix}$$

In this example, after the quantized spreading sequence matrix $S_{quan}$ is obtained, power of the quantized spreading sequence matrix $S_{quan}$ may further be normalized to ensure that power of each column is 1. For example, a normalized matrix having the same dimension as the second dimension (i.e., the number of columns) of the quantized spreading sequence matrix $S_{quan}$ may be determined, and then the normalized matrix is multiplied with the quantized spreading sequence matrix $S_{quan}$ to obtain a final spreading sequence matrix $S_{final}$. Therefore, the spreading sequence may be determined according to the final spreading sequence matrix $S_{final}$.

According to another example of this embodiment, the spreading sequence matrix may be generated according to quantized performance parameters of the plurality of user terminals, where the quantized performance parameters of the plurality of user terminals are generated by quantizing the performance parameters of the plurality of user terminals. For example, assuming that the performance parameters are average received powers of user terminals, the average received powers of the user terminals may be quantized firstly, and then the spreading sequence matrix may be generated according to the quantized average received powers.

Specifically, assuming that the performance parameters are average received powers of user terminals, Signal to Noise Ratios (SNRs) in dB of the user terminals may be generated firstly according to the average received powers of the user terminals, and then quantized SNRs are obtained by quantizing the SNRs of the user terminals in a predetermined quantization step size according to a predetermined rule. Then, quantized average received powers in watts of the user terminals are generated according to the quantized SNRs. Finally, the spreading sequence matrix is generated according to the quantized average received powers of the user terminals.

For example, according to average received powers of six user terminals, Signal to Noise Ratios of the six user terminals are generated as {−2.3, −1, −0.5, 3.6, 6.4, 7.5} (in dB), respectively. Then, the SNRs of the six user terminals are quantized according to a rule of rounding up with a quantization step size of 5 dB, to generate the quantized SNRs as {0, 0, 0, 5, 10, 10}, respectively. Then, quantized average received powers are generated according to the quantized SNRs {0, 0, 0, 5, 10, 10}. Finally, the spreading sequence matrix is generated according to the quantized average received powers of the six user terminals.

Step S101 has been described above. After step S101, step S102 may be further performed. In step S102, initial symbols are spread by using the determined spreading sequence to generate spread symbols.

In this embodiment, a plurality of spread symbols may be generated when the initial symbols are spread by using the spreading sequence, and the number of the plurality of spread symbols and the spreading factor of the spreading sequence are the same. For example, when the spreading factor N=4, 4 spread symbols may be generated when the initial symbols are spread by using the spreading sequence.

According to one example of this embodiment, assuming that the performance parameters are SINRs of user terminals, the transmission power may be determined by using the power matrix described above, and then the spread symbols are transmitted by using the determined transmission power after step S102.

According to another example of this embodiment, after the initial symbols are spread to generate the spread symbols by using the spreading sequence in step S102, a real-time measured transmission power may also be determined, where the real-time measured transmission power is generated according to actual measurement for one user terminal. Then, the spread symbols are transmitted by using the determined real-time measured transmission power to generate real-time measured performance parameters. Then, the performance parameters used to generate the spreading sequence matrix are adjusted according to the real-time measured performance parameters.

For example, assuming that the performance parameters are SINRs of user terminals, the user terminals may use spreading sequences of the spreading sequence matrix to spread the initial symbols to generate spread symbols, and transmit spread symbols of the plurality of user terminals with the real-time measured power matrix to generate real-time measured SINRs of the user terminals. Then, the real-time measured SINRs are compared with the SINRs used to generate the spreading sequence matrix. When the real-time measured SINR of one user terminal is smaller than its SINR used to generate the spreading sequence matrix, the SINR of the user terminal used to generate the spreading sequence matrix may be adjusted, for example, the SINR used to generate the spreading sequence matrix may be increased.

However, the present disclosure is not limited thereto. When the real-time measured SINR of one user terminal is less than its SINR used to generate the spreading sequence matrix, one or more user terminals whose real-time measured SINRs are not less than their SINRs used to generate the spreading sequence matrix may be found, and then the SINRs of the one or more user terminals used to generate the spreading sequence matrix may be reduced.

Furthermore, after a SINR used to generate the spreading sequence matrix is adjusted, the adjusted SINR may be used to generate the spreading sequence matrix next time.

The method for generating spread symbols for a NOMA system provided according to this embodiment generates, for a plurality of user terminals having different average received powers, spreading sequences when the system capacity parameter achieves the optimal value under certain constraints, and generates spreading sequences according to SINRs of the plurality of user terminals when the system power parameter achieves the optimal value under certain constraints, thereby minimizing interference between user terminals.

Figure 2:
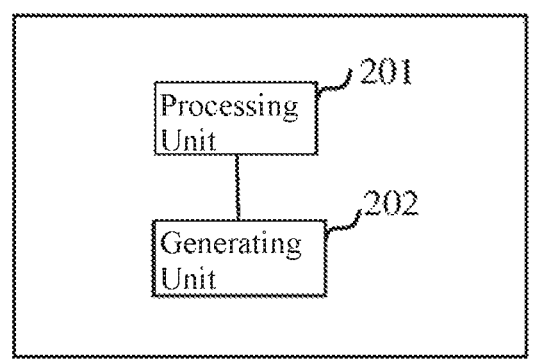
FIG. 2 shows a schematic structural diagram of an apparatus for performing the method shown in FIG. 1 according to the embodiments of the present disclosure.

An apparatus for performing the method 100 shown in FIG. 1 according to one embodiment of the present disclosure will be described below with reference to FIG. 2. FIG. 2 shows a schematic structural diagram of the apparatus 200 for performing the method 100 shown in FIG. 1. The apparatus 200 for generating spread symbols shown in FIG. 2 may be a communication device such as a base station, a user terminal and the like. For example, the apparatus 200 for generating spread symbols shown in FIG. 2 may be a communication device in a NOMA system.

As shown in FIG. 2, the apparatus 200 comprises a processing unit 201 configured to determine a spreading sequence for the apparatus according to a spreading sequence matrix, where the spreading sequence matrix is generated according to performance parameters of a plurality of user terminals. The apparatus 200 further comprises a generating unit 202 configured to spread initial symbols by using the determined spreading sequence to generate spread symbol. The apparatus 200 may further comprise other components in addition to these two units, however, since these components are not related to the content of the embodiments of the present disclosure, illustration and description thereof are omitted herein. Furthermore, since specific details of the following operations performed by the apparatus 200 according to the embodiments of the present disclosure are the same as those described above with reference to equations 1-20, repeated descriptions of the same details are omitted herein to avoid repetition.

In this embodiment, the processing unit 201 determines the spreading sequence for the apparatus 200 according to the spreading sequence matrix. Moreover, in this embodiment, a performance parameter may include a power parameter.

For example, the power parameter may indicate a transmission power or a received power of the apparatus 200. Alternatively, the power parameter may be a Signal to Interference plus Noise Ratio (SINR) of the apparatus 200. In this embodiment, when the performance parameter is a transmission power or a received power, the performance parameters may be at least partially different for the plurality of user terminals. Alternatively, when the performance parameter is a Signal to Interference plus Noise Ratio, the performance parameters may be at least partially different or the same.

According to one example of this embodiment, the apparatus 200 may generate the spreading sequence matrix according to performance parameters of a plurality of user terminals. For example, when the apparatus 200 is a base station, the spreading sequence matrix may be generated according to performance parameters of a plurality of user terminals that communicate with the base station.

According to another example of this embodiment, the apparatus 200 may determine the spreading sequence matrix by a received signaling. For example, when the apparatus 200 is a user terminal, the spreading sequence matrix may be determined according to a signaling received from the base station.

In this embodiment, the spreading sequence matrix used to determine the spreading sequence may also be referred to as a codebook for the spreading sequence. Alternatively, the spreading sequence matrix used to determine the spreading sequence may also be referred to as a code book, or a spreading sequence pool or a sequence pool for the spreading sequence. Accordingly, the spreading sequence determined according to the spreading sequence matrix may also be referred to as a codeword or a signature.

Furthermore, according to another example of this embodiment, the spreading sequence matrix is formed according to a first spreading sequence matrix related to a first part of user terminals of the plurality of user terminals and a second spreading sequence matrix related to a second part of user terminals of the plurality of user terminals. The first part of user terminals and the second part of user terminals may be determined according to the performance parameters, the first spreading sequence matrix may be determined according to performance parameters of the first part of user terminals, and the second spreading sequence matrix may be determined according to performance parameters of the second part of user terminals.

In this example, a part of user terminals of the plurality of user terminals may be the first part of user terminals, and the remaining user terminals may be the second part of user terminals. Alternatively, each of the plurality of user terminals may be the second part of user terminals.

Specifically, for one user terminal of the plurality of user terminals, whether the user terminal belongs to the first part of user terminals or the second part of user terminals may be determined according to a performance parameter of the user terminal and the performance parameters of the plurality of user terminals.

For example, for one user terminal of the plurality of user terminals, a first value may be generated according to a performance parameter of the user terminal, and a second value may be generated according to the performance parameters of the plurality of user terminals. Then, magnitudes of the first value and the second value are compared: when the first value is greater than the second value, the user terminal is determined as one of the first part of user terminals; when the first value is less than or equal to the second value, the user terminal is determined as one of the second part of user terminals.

According to one example of this embodiment, the first value may be equal to the performance parameter of the user terminal, or may be a value obtained by performing a mathematical operation on the performance parameter of the user terminal. The second value may be a value obtained by performing a mathematical operation on a sum of performance parameters of user terminals among other user terminals and having performance parameters smaller than the performance parameter of the user terminal, a spreading factor of the spreading sequence, and the number of user terminals among the plurality of user terminals (i.e., all user terminals) having performance parameters larger than or equal to the performance parameter of the user terminal.

For example, assuming that the performance parameters are average received powers of user terminals, the number of the plurality of user terminals is K, average received powers of the K user terminals are $\{P_1, \ldots, P_i, \ldots, P_K\}$, respectively, and the spreading factor is N, where K is a positive integer, i is a positive integer, and $1 \le i \le K$. For the i-th user terminal, the first value $P_i$ is generated according to average received power $P_i$ of the i-th user terminal, and according to the average received powers $\{P_1, \ldots, P_i, \ldots, P_K\}$ of all user terminals, the second value is generated as:

$$\frac{\sum_{j=1}^{K} P_j 1_{\{P_i > P_j\}}}{N - \sum_{j=1}^{K} 1_{\{P_j \ge P_i\}}}$$

In this second value, the physical meaning of $\sum_{j=1}^{K} P_j 1_{\{P_i > P_j\}}$ refers to a sum of average received powers among the average received powers $\{P_1, \ldots, P_i, \ldots, P_K\}$ of all user terminals that are smaller than $P_i$, the physical meaning of $N - \sum_{j=1}^{K} 1_{\{P_j \ge P_i\}}$ refers to a difference between the spreading factor N and the number of user terminals whose average received powers among the average received powers $\{P_1, \ldots, P_i, \ldots, P_K\}$ of all user terminals are greater than t or equal to $P_i$. Then, magnitudes of $P_i$ and $$\frac{\sum_{j=1}^{K} P_j 1_{\{P_i > P_j\}}}{N - \sum_{j=1}^{K} 1_{\{P_j \ge P_i\}}}$$

are compared: when $$P_i > \frac{\sum_{j=1}^{K} P_j 1_{\{P_i > P_j\}}}{N - \sum_{j=1}^{K} 1_{\{P_j \ge P_i\}}},$$

the i-th user terminal is determined as one of the first part of user terminals; when $$P_i \le \frac{\sum_{j=1}^{K} P_j 1_{\{P_i > P_j\}}}{N - \sum_{j=1}^{K} 1_{\{P_j \ge P_i\}}},$$

the i-th user terminal is determined as one of the second part of user terminals.

As another example, assuming that the performance parameters are SINRs of user terminals, and the number of the plurality of user terminals is K, SINRs of the K user terminals are $\{\beta_1, \ldots, \beta_i, \ldots, \beta_K\}$, respectively, and the spreading factor is N, where K is a positive integer, i is a positive integer, and $1 \le i \le K$. For the i-th user terminal, the first value $$e_i = \frac{\beta_i}{1 + \beta_i}$$

is generated according to the SINR $\beta_i$ of the i-th user terminal, and according to the SINRs $\{\beta_1, \ldots, \beta_i, \ldots, \beta_K\}$ of all user terminals, the second value is generated as:

$$\frac{\sum_{j=1}^{K} e_j 1_{\{e_i > e_j\}}}{N - \sum_{j=1}^{K} 1_{\{e_j \geq e_i\}}}$$

In this second value, the physical meaning of $\Sigma_{j=1}^{K} e_j 1_{\{e_i > e_j\}}$ refers to a sum of first values among the first values of all user terminals that are smaller than $e_i$, the physical meaning of $N - \Sigma_{j=1}^{K} 1_{\{e_j \geq e_i\}}$ refers to a difference between the spreading factor N and the number of user terminals whose first values among the first values of all user terminals are greater than or equal to $e_i$. Then, magnitudes of $e_i$ $$\frac{\sum_{j=1}^{K} e_j 1_{\{e_i > e_j\}}}{N - \sum_{j=1}^{K} 1_{\{e_j \geq e_i\}}}$$

are compared: when $$e_i > \frac{\sum_{j=1}^{K} e_j 1_{\{e_i > e_j\}}}{N - \sum_{j=1}^{K} 1_{\{e_j \geq e_i\}}},$$

the i-th user terminal is determined as one of the first part of user terminals; when $$e_i \leq \frac{\sum_{j=1}^{K} e_j 1_{\{e_i > e_j\}}}{N - \sum_{j=1}^{K} 1_{\{e_j \geq e_i\}}},$$

the i-th user terminal is determined as one of the second part of user terminals.

In this example, the SINRs of the K user terminals may satisfy a condition of $\beta_1 \geq \ldots \geq \beta_K$. Certainly, the SINRs of the K user terminals may also satisfy other restrictive conditions, which is not limited in the present disclosure.

Furthermore, the first part of user terminals and the second part of user terminals may also have more specific names. For example, assuming that the performance parameters are average received powers of user terminals, the first part of user terminals may be referred to as oversized user terminals, and the second part of user terminals may be referred to as non-oversized user terminals. As another example, when the performance parameters are SINRs of user terminals, the first part of user terminals may be referred to as overloading user terminals, and the second part of user terminals may be referred to as non-overloading user terminals.

Then, the first spreading sequence matrix may be generated according to the performance parameters of the first part of user terminals. For example, assuming that m user terminals are determined as the first part of user terminals, (K−m) user terminals are determined as the second part of user terminals, where m is a positive integer and $1 \leq m \leq (N-1)$, and then the first spreading sequence matrix may be generated according to performance parameters of the m user terminals.

Specifically, for example, assuming that the performance parameters are average received powers of user terminals or SINRs of user terminals, the spreading factor N is equal to 4 (N=4), and the number of the plurality of user terminals K is equal to 6 (K=6), the first and second user terminals are determined as the first part of user terminals (i.e., m=2), and the third, fourth, fifth, and sixth user terminals are determined as the second part of user terminals (i.e., (K−m)=4). Then, according to performance parameters of the first and second user terminals, a 2×2 identity matrix $I_2$ may be generated as:

$$\begin{bmatrix} 1 & 0 \\ 0 & 1 \end{bmatrix}$$

That is, the first spreading sequence matrix is a 2×2 identity matrix $I_2$. The first column of the first spreading sequence matrix corresponds to the first user terminal, and the second column corresponds to the second user terminal.

Furthermore, assuming that the performance parameters are SINRs of user terminals, a transmission power may also be determined according to a power matrix, where the power matrix is generated according to a first power matrix and a second power matrix. The first power matrix is generated according to the performance parameters of the first part of user terminals and a noise parameter of a communication system including the plurality of user terminals. The second power matrix is generated according to the performance parameters of the second part of user terminals and the noise parameter of the communication system including the plurality of user terminals. Then, the spread symbols may be transmitted later by using the determined transmission power. The second power matrix will be described in detail later, and the first power matrix will be described herein firstly.

For example, in the above-described example of "assuming that the performance parameters are average received powers of user terminals or SINRs of user terminals, the spreading factor N is equal to 4 (N=4), and the number of the plurality of user terminals K is equal to 6 (K=6)", in accordance with the above equation (1), received powers of the first and the second user terminals may be determined as $P_1$ and $P_2$, respectively, according to SINRs of the first and second user terminal and the noise (e.g., Gaussian white noise) parameter of the communication system including the plurality of user terminals. Then, according to the received powers $P_1$ and $P_2$ of the first and second user terminals, the first power matrix may be generated as $\text{diag}\{\sigma^2 \beta_i\}_{1 \leq i \leq m}$.

Then, the second spreading sequence matrix may be generated according to the performance parameters of the second part of user terminals. For example, assuming that m user terminals are determined as the first part of user terminals, (K−m) user terminals are determined as the second part of user terminals, then, the second spreading sequence matrix may be generated according to performance parameters of the (K−m) user terminals.

Specifically, assuming that the performance parameters are average received powers of user terminals, the second spreading sequence matrix may be generated according to the average received powers of the second part of user terminals and a system capacity parameter of the communication system including the plurality of user terminals. Alternatively, assuming that the performance parameters are SINRs of user terminals, the second spreading sequence matrix may be generated according to the SINRs of the second part of user terminals and a system power parameter of the communication system including the plurality of user terminals.

Hereinafter, assuming that the performance parameters are average received powers of user terminals, how to generate the second spreading sequence matrix according to the average received powers of the second part of user terminals and the system capacity parameter of the communication system including the plurality of user terminals will be described.

A matrix Q may be constructed firstly according to the average received powers of the second part of user terminals and the system capacity parameter of the communication system including the plurality of user terminals. An example of constructing the matrix Q will be given herein.

In this example, the system capacity parameter may be a channel capacity C. The channel capacity C may be obtained by the above equation (2).

After formula derivation, the above equation (2) may be transformed into the above equation (3). Therefore, when the channel capacity C achieves an optimal value under the constraint condition as shown in the above equation (4), values of $\lambda_n(S)$ and C(S) are as shown in the above equations (5A) and (5B).

Then, an eigenvalue matrix $\Lambda$ related to the second part of user terminals is determined according to $\lambda^*(S)$, and $\Lambda$ is a diagonal matrix as shown in the above equation (6). In the eigenvalue matrix $\Lambda$, the number of elements with a value of 0 on the diagonal is equal to (K−N).

The matrix Q may then be constructed according to the eigenvalue matrix $\Lambda$ and the diagonal elements $\{P_j|(m+1) \leq j \leq K\}$. Herein, the constructed matrix Q is not unique.

After the matrix Q is constructed, the constructed matrix Q is decomposed to obtain an eigenvector matrix U, as shown in the above equation (7). In the above equation (7), $U^H$ is the conjugate transposed matrix of the eigenvector matrix U.

After the eigenvector matrix U is obtained, column vectors whose corresponding eigenvalues are not zero are selected from the eigenvector matrix U to obtain a modified eigenvector matrix $\tilde{U}$, and non-zero eigenvalues are selected from the eigenvalue matrix $\Lambda$ to form a diagonal matrix as a modified eigenvalue matrix $\tilde{\Lambda}$.

Then, a power matrix $\tilde{D}$ of the second part of user terminals is determined, and the power matrix $\tilde{D}$ is a diagonal matrix diag($P_j|(m+1)\leq j\leq K$). Then, in accordance with the above equation (8), the second spreading sequence matrix $S_{non}$ is generated according to the modified eigenvector matrix $\tilde{U}$, the modified eigenvalue matrix $\tilde{\Lambda}$ and the power matrix $\tilde{D}$.

So far, the specific process of generating the second spreading sequence matrix according to the average received powers of the second part of user terminals and the system capacity parameter of the communication system including the plurality of user terminals under the assumption that the performance parameters are average received powers of user terminals has been described. In order to describe the variety of matrices involved in the above specific process more clearly, the variety of matrices involved in the above specific process will be explained herein with the above-described example of "assuming that the performance parameters are average received powers of user terminals or SINRs of user terminals, the spreading factor N=is equal to 4 (N=4), and the number of the plurality of user terminals K is equal to 6 (K=6)".

Specifically, in the example of "assuming that the performance parameters are average received powers of user terminals or SINRs of user terminals, the spreading factor N is equal to 4 (N=4), and the number of the plurality of user terminals K is equal to 6 (K=6)", the matrix Q may be constructed firstly according to average received powers of the third, fourth, fifth, and sixth user terminals and the system capacity parameter.

In this example, the channel capacity C is as shown in the above equation (2), where I is a 4×4 identity matrix, S is a 4×6 matrix, and D is a 6×6 diagonal matrix diag$\{P_1, P_2, P_3, P_4, P_5, P_6\}$ generated from average received powers of 6 user terminals.

After formula derivation, when the channel capacity C achieves the optimal value under the constraint as shown in the above equation (4), the value of $\lambda_n(S)$ is:

$$\lambda^*(S) = \left(\frac{P_3+P_4+P_5+P_6}{2}, \frac{P_3+P_4+P_5+P_6}{2}, P_1, P_2\right).$$

Then, the eigenvalue matrix $\Lambda$ related to the second part of user terminals is determined according to $\lambda^*(S)$, and the eigenvalue matrix $\Lambda$ is a 4×4 diagonal matrix $$\text{diag}\left(\frac{P_3+P_4+P_5+P_6}{2}, \frac{P_3+P_4+P_5+P_6}{2}, 0, 0\right).$$

Then, the matrix Q is constructed according to the eigenvalue matrix $\Lambda$ and the diagonal elements $\{P_3, P_4, P_5, P_6\}$, and the matrix Q is a 4×4 matrix. After the matrix Q is constructed, the matrix Q is decomposed to obtain the eigenvector matrix U, which is a 4×4 matrix.

Then, column vectors of the first column and the second column are selected from the eigenvector matrix U to generate the modified eigenvector matrix $\tilde{U}$, which is a 4×2 matrix. Non-zero eigenvalues of the eigenvalue matrix $\Lambda$ are used as diagonal elements to generate the modified eigenvalue matrix $$\tilde{\Lambda} = \text{diag}\left(\frac{P_3+P_4+P_5+P_6}{2}, \frac{P_3+P_4+P_5+P_6}{2}\right).$$

Then, the power matrix for the second part of user terminals is determined as $\tilde{D}=\text{diag}\{P_3, P_4, P_5, P_6\}$, which is a 4×4 diagonal matrix.

Finally, in accordance with the above equation (8), the second spreading sequence matrix $S_{non}$ is generated according to the modified eigenvector matrix $\tilde{U}$, the modified eigenvalue matrix n and the power matrix $\tilde{D}$, where $S_{non}$ is a 2×4 matrix. The first column of the $S_{non}$ corresponds to the third user terminal, the second column of the $S_{non}$ corresponds to the fourth user terminal, the third column of the $S_{non}$ corresponds to the fifth user terminal, and the fourth column of the $S_{non}$ corresponds to the sixth user terminal.

It has been described above that how to generate the second spreading sequence matrix according to the average received powers of the second part of user terminals and the system capacity parameter of the communication system including the plurality of user terminals under the assumption that the performance parameters are average received powers of user terminals. How to generate the second spreading sequence matrix according to the SINRs of the second part of user terminals and the system power parameter of the communication system including the plurality of user terminals under the assumption that the performance parameters are SINRs of user terminals will be described below.

A matrix Q may be constructed firstly according to the SINRs of the second part of user terminals and the system power parameter of the communication system including the plurality of user terminals. An example of constructing the matrix Q will be given herein.

In this example, SINR of each user terminal may be expressed as the above equation (9), which after formula derivation, may be expressed as the above equation (10). Then, the matrix Q is defined in accordance with the above equation (11).

In this example, the system power parameter may be the sum of the average received powers of all user terminals, that is, $\Sigma_{i=1}^{K} P_i$. When the system power parameter achieves a minimum value under the constraint condition as shown in the above equation (12), eigenvalues $\lambda_n(Q)$ of the matrix Q are as shown in the above equation (13).

Then, an eigenvalue matrix V related to the second part of user terminals is determined according to $\lambda^*(Q)$, and V is a diagonal matrix as shown in the above equation. In the eigenvalue matrix V, the number of elements with a value of 0 on the diagonal is equal to (K−N).

Then, a matrix $Q_{non}$ may be constructed according to the eigenvalue matrix V and the diagonal elements $$\left\{ \frac{\beta_j}{1+\beta_j} \,\middle|\, (m+1) \le j \le K \right\}.$$

Herein, the constructed $Q_{non}$ is not unique.

After the matrix $Q_{non}$ is constructed, the constructed matrix $Q_{non}$ is decomposed to obtain an eigenvector matrix U, as shown in the above equation (15)

Then, the diagonal matrix $\Lambda$ is determined, as shown in the above equation (16). Then, in accordance with the above equation (17), a second power matrix $D_{non}$ is generated according to the eigenvector matrix U and the diagonal matrix $\Lambda$. Then, column vectors whose corresponding eigenvalues are not zero are selected from the eigenvector matrix U to generate a modified eigenvector matrix Ũ, and non-zero eigenvalues are selected from the eigenvalue matrix $\Lambda$ to form a diagonal matrix as a modified eigenvalue matrix $\tilde{\Lambda}$. Then, in accordance with the above equation (18), the second spreading sequence matrix $S_{non}$ is generated according to the modified eigenvector matrix Ũ, the modified eigenvalue matrix $\tilde{\Lambda}$ and the second power matrix $D_{non}$.

So far, the specific process of generating the second spreading sequence matrix according to the SINRs of the second part of user terminals and the system power parameter of the communication system including the plurality of user terminals under the assumption that the performance parameters are SINRs s of user terminals has been described. In order to describe the variety of matrices involved in the above specific process more clearly, the variety of matrices involved in the above specific process will be explained herein with the above-described example of "assuming that the performance parameters are average received powers of user terminals or SINRs of user terminals, the spreading factor N is equal to 4 (N=4), and the number of the plurality of user terminals K is equal to 6 (K=6)".

Specifically, in the example of "assuming that the performance parameters are average received powers of user terminals or SINRs of user terminals, the spreading factor N is equal to 4 (N=4), and the number of the plurality of user terminals K is equal to 6 (K=6)", the matrix Q may be constructed firstly according to the SINRs of the third, fourth, fifth, and sixth user terminals and the system power parameter.

In this example, the defined matrix Q is as shown in the above equation (11), where I is a 4×4 identity matrix, S is a 4×6 matrix, and D is a 6×6 diagonal matrix diag$\{P_1, P_2, P_3, P_4, P_5, P_6\}$ generated from the average received powers of 6 user terminals.

After formula derivation, when the system power parameter achieves an optimal value under the constraint as shown in the above equation (12), the value of $\lambda_n(Q)$ is:

$$\lambda^*(Q) = \left\{ \frac{\frac{\beta_3}{1+\beta_3} + \frac{\beta_4}{1+\beta_4} + \frac{\beta_5}{1+\beta_5} + \frac{\beta_6}{1+\beta_6}}{2}, \right.$$

$$\left. \frac{\frac{\beta_3}{1+\beta_3} + \frac{\beta_4}{1+\beta_4} + \frac{\beta_5}{1+\beta_5} + \frac{\beta_6}{1+\beta_6}}{2}, \frac{\beta_1}{1+\beta_1}, \frac{\beta_2}{1+\beta_2} \right\}.$$

Then, the eigenvalue matrix V related to the second part of user terminals is determined according to $\lambda^*(Q)$, and the eigenvalue matrix V is a 4×4 diagonal matrix $$\text{diag}\left\{ \frac{\frac{\beta_3}{1+\beta_3} + \frac{\beta_4}{1+\beta_4} + \frac{\beta_5}{1+\beta_5} + \frac{\beta_6}{1+\beta_6}}{2}, \right.$$

$$\left. \frac{\frac{\beta_3}{1+\beta_3} + \frac{\beta_4}{1+\beta_4} + \frac{\beta_5}{1+\beta_5} + \frac{\beta_6}{1+\beta_6}}{2}, 0, 0 \right\}.$$

Then, the matrix $Q_{non}$ is constructed according to the eigenvalue matrix V and the diagonal elements $$\left\{ \frac{\beta_3}{1+\beta_3}, \frac{\beta_4}{1+\beta_4}, \frac{\beta_5}{1+\beta_5}, \frac{\beta_6}{1+\beta_6} \right\},$$

and the matrix $Q_{non}$ is a 4×4 matrix. After the matrix $Q_{non}$ is constructed, the matrix $Q_{non}$ is decomposed to obtain the eigenvector matrix U, which is a 4×4 matrix.

Then, the diagonal matrix $$\Lambda = \text{diag}\left\{ \left(1 - \frac{1}{2}\sum_{j=3}^{6} \frac{\beta_j}{1+\beta_j}\right)^{-1} - \sigma^2, \left(1 - \frac{1}{2}\sum_{j=3}^{6} \frac{\beta_j}{1+\beta_j}\right)^{-1} - \sigma^2, 0, 0 \right\}$$

is determined, which is a 4×4 diagonal matrix.

Then, in accordance with the above equation (17), the second power matrix $D_{non}$ is generated according to the eigenvector matrix U and the diagonal matrix Λ, and the $D_{non}$ is a 4×4 matrix.

Then, column vectors of the first column and the second column are selected from the eigenvector matrix U to generate the modified eigenvector matrix $\tilde{U}$, which is a 4×2 matrix. Non-zero eigenvalues of the eigenvalue matrix Λ are used as diagonal elements to generate the modified eigenvalue matrix $$\tilde{\Lambda} = \text{diag}\left\{\left(1 - \frac{1}{2}\sum_{j=3}^{6}\frac{\beta_j}{1+\beta_j}\right)^{-1} - \sigma^2, \left(1 - \frac{1}{2}\sum_{j=3}^{6}\frac{\beta_j}{1+\beta_j}\right)^{-1} - \sigma^2\right\}.$$

Then, in accordance with the above equation (18), the second spreading sequence matrix $S_{non}$ is generated according to the modified eigenvector matrix $\tilde{U}$, the modified eigenvalue matrix $\tilde{\Lambda}$ and the second power matrix $D_{non}$, where $S_{non}$ is a 2×4 matrix. The first column of the $S_{non}$ corresponds to the third user terminal, the second column of the $S_{non}$ corresponds to the fourth user terminal, the third column of the $S_{non}$ corresponds to the fifth user terminal, and the fourth column of the $S_{non}$ corresponds to the sixth user terminal.

In addition, after the first part of user terminals and the second part of user terminals are determined according to the performance parameters, the first spreading sequence matrix may be generated according to the performance parameters of the first part of user terminals and, simultaneously, the second spreading sequence matrix may be generated according to the performance parameters of the second part of user terminals.

Then, the spreading sequence matrix may be generated according to the first spreading sequence matrix and the second spreading sequence matrix. For example, assuming that m user terminals are determined as the first part of user terminals, (K−m) user terminals are determined as the second part of user terminals, where m is a positive integer and 1≤m≤K (N−1), then, the first spreading sequence matrix may be generated according to performance parameters of the m user terminals, and the second spreading sequence matrix may be generated according to performance parameters of the (K−m) user terminals. Then, the spreading sequence matrix may be generated according to the first spreading sequence matrix and the second spreading sequence matrix.

Specifically, for example, in the above-described example of "assuming that the performance parameters are the average received powers of the user terminals or SINRs of user terminals, the spreading factor N is equal to 4 (N=4), and the number of the plurality of user terminals K is equal to 6 (K=6)", the first spreading sequence matrix $I_2$ may be generated according to the performance parameters of the first and second user terminals, and the second spreading sequence matrix $S_{non}$ may be generated according to the performance parameters of the third, fourth, fifth, and sixth user terminals. Then, the spreading sequence matrix S may be generated according to the first spreading sequence matrix $I_2$ and the second spreading sequence matrix $S_{non}$, as shown in the above equation (19). The spreading sequence matrix S is a 4×6 matrix, and the first column corresponds to the first user terminal, the second column corresponds to the second user terminal, the third column corresponds to the third user terminal, the fourth column corresponds to the fourth user terminal, the fifth column corresponds to the fifth user terminal, and the sixth column corresponds to the sixth user terminal.

The example of determining the spreading sequence matrix S with the first and second user terminals of the plurality of user terminals as the first part of user terminals, and the third, fourth, fifth, and sixth user terminals of the plurality of user terminals as the second part of user terminals has been described above. Alternatively, when each of the plurality of user terminals belongs to a second part of user terminals, that is, the first, second, third, fourth, fifth, and sixth user terminals all belong to the second part of user terminals, the spreading sequence matrix S may be determined simply according to $S_{non}$.

Furthermore, as described above, assuming that the performance parameters are SINRs of user terminals, the processing unit 201 may further determine the transmission power according to the power matrix, where the power matrix is generated according to the first power matrix and the second power matrix. The first power matrix is generated according to the performance parameters of the first part of user terminals and the noise parameter of the communication system including the plurality of user terminals, and the second power matrix is generated according to the performance parameters of the second part of user terminals and the noise parameter of the communication system including the plurality of user terminals.

For example, in the above-described example of "assuming that the performance parameters are average received powers of user terminals or SINRs of user terminals, the spreading factor N is equal to 4 (N=4), and the number of the plurality of user terminals K is equal to 6 (K=6)", the first power matrix $\text{diag}\{\sigma^2\beta_i\}_{1\leq i\leq m}$ may be generated according to the SINRs of the first and second user terminals and the Gaussian white noise parameter, and the second power matrix $D_{non}$ may be generated according to the SINRs of the third, fourth, fifth and sixth user terminals and the Gaussian white noise parameter. Then, the power matrix P may be generated according to the first power matrix $\text{diag}\{\sigma^2\beta_i\}_{1\leq i\leq m}$ and the second power matrix $D_{non}$, as shown in the above equation (20). Then, a transmission power of the first user terminal is determined according to the first diagonal element of the power matrix P, a transmission power of the second user terminal is determined according to the second diagonal element of the power matrix P, a transmission power of the third user terminal is determined according to the third diagonal element of the power matrix P, a transmission power of the fourth user terminal is determined according to the fourth diagonal element of the power matrix P, a transmission power of the fifth user terminal is determined according to the fifth diagonal element of the power matrix P, and transmission power of the sixth user terminal is determined according to the sixth diagonal element of the power matrix P.

The example of determining the power matrix P with the first and second user terminals of the plurality of user terminals as the first part of user terminals, and the third, fourth, fifth, and sixth user terminals of the plurality of user terminals as the second part of user terminals has been described above. Alternatively, when each of the plurality of user terminals belongs to the second part of user terminals, that is, the first, second, third, fourth, fifth, and sixth user terminals all belong to the second part of user terminals, the power matrix P may be determined simply according to $D_{non}$.

Furthermore, when the apparatus 200 is a base station, the base station may perform the process described above. For example, the base station may determine the first part of user terminals and the second part of user terminals according to the performance parameters, generate the first spreading sequence matrix according to the performance parameters of the first part of user terminals, generate the second spreading sequence matrix according to the performance parameters of the second part of user terminals, and generate the spreading sequence matrix according to the first spreading sequence matrix and the second spreading sequence matrix.

As another example, for one user terminal of the plurality of user terminals, the base station may determine whether the user terminal belongs to the first part of user terminals or the second part of user terminals according to a performance parameter of the user terminal and the performance parameters of the plurality of user terminals.

As yet another example, the base station may generate the second spreading sequence matrix according to the performance parameters of the second part of user terminals and the system capacity parameter of the communication system including the plurality of user terminals. Alternatively, the base station may also generate the second spreading sequence matrix according to the performance parameters of the second part of user terminals and the system power parameter of the communication system including the plurality of user terminals.

As yet another example, the base station may generate the power matrix according to the first power matrix and the second power matrix, generate the first power matrix according to the performance parameters of the first part of user terminals and the noise parameter of the communication system including the plurality of user terminals, and generate the second power matrix according to the performance parameters of the second part of user terminals and the noise parameter of the communication system including the plurality of user terminals.

Furthermore, according to another example of this embodiment, when the apparatus 200 is a user terminal, in grant-free uplinks of the NOMA system, the processing unit the spreading sequence matrix $S_{orth}$. For example, elements in the spreading sequence matrix $S_{orth}$ may be mapped on a complex plane coordinate system. Then, for each element, coordinates closest to the element are determined, and the element is quantized to the value represented by the coordinates. For example, the real and imaginary parts of the value represented by the coordinates may be $\{0, \pm1\}$, $\{0, \pm1, \pm2\}$, $\{0, \pm1, \pm2, \pm3\}$, and so on.

As another example, the processing unit 201 may further map the elements in the spreading sequence matrix $S_{orth}$ on a constellation map in the prior art. Then, for each element, the constellation point closest to the element is determined, and the element is quantized to the value represented by the constellation point. For example, the real and imaginary parts of the value represented by the constellation point may be $\{\pm1\}$, $\{\pm1, \pm3\}$, $\{\pm1, \pm3, \pm5, \pm7\}$, and so on.

Alternatively, the processing unit 201 may further modify the constellation map in the prior art. For example, the constellation map in the prior art is expanded to include the origin point $\{0\}$, and then the elements in the spreading sequence matrix $S_{orth}$ are mapped on the modified constellation map including the origin point 101. Then, for each element, the constellation point or the origin point closest to the element is determined, and the element is quantized to the value represented by the constellation point or the origin point.

In this example, before mapping the spreading sequence matrix $S_{orth}$ on the complex plane coordinate system or the constellation map, the processing unit 201 may expand the elements in the spreading sequence matrix $S_{orth}$ synchronously to further improve quantization accuracy.

An example of the processing unit 201 mapping the elements in the spreading sequence matrix $S_{orth}$ on the modified constellation map 9-QAM including the origin point 101 for quantization is given below. For example, the processing unit 201 obtain the spreading sequence matrix $S_{orth}$ as:

$$\begin{bmatrix} -0.5 & -0.1640+0.2852i & 0.1656+0.2391i & 0.5960+0.4031i & -0.0952+0.3920i & -0.0457-0.6121i \\ 0.5 & -0.4467-0.5525i & 0.3550-0.0918i & 0.4346+0.0003i & -0.5470+0.2171i & -0.2100+0.1772i \\ -0.5 & -0.1978-0.4058i & -0.5979+0.2685i & 0.5127-0.0752i & 0.1879-0.1488i & 0.0411+0.5376i \\ 0.5 & 0.0406-0.4261i & -0.4234+0.4149i & -0.0712-0.1406i & 0.4590+0.4720i & 0.0468-0.5049i \end{bmatrix}$$

201 may randomly select a column from the spreading sequence matrix as the spreading sequence; while in grant-based uplinks of the NOMA system, the processing unit 201 may receive indication information from the base station, and select a column from the spreading sequence matrix as the spreading sequence according to the indication information.

In addition, according to another example of this embodiment, the spreading sequence matrix according to which the processing unit 201 determines the spreading sequence may be a matrix generated by multiplying a unit orthogonal matrix and the spreading sequence matrix. Specifically, after the spreading sequence matrix S is generated, a unit orthogonal matrix having the same dimension as the first dimension (i.e., the number of rows) of the spreading sequence matrix S may be determined, and then the unit orthogonal matrix is multiplied with the spreading sequence matrix S to obtain another spreading sequence matrix $S_{orth}$.

In this example, after obtaining the spreading sequence matrix $S_{orth}$, the processing unit 201 may further quantize The elements in the spreading sequence matrix $S_{orth}$ may be mapped on the modified constellation map 9-QAM for quantization, and then a quantized spreading sequence matrix $S_{quan}$ is obtained:

$$\begin{bmatrix} -1 & i & i & 1+i & i & -i \\ 1 & -1-i & 1 & 1 & -1+1 & -1 \\ -1 & -i & -1+i & 1 & 0 & i \\ 1 & -i & -1+i & 0 & 1+i & -i \end{bmatrix}.$$

In this example, after obtaining the quantized spreading sequence matrix $S_{quan}$, the processing unit 201 may normalize power of the quantized spreading sequence matrix $S_{quan}$ to ensure that power of each column is 1. For example, the processing unit 201 may determine a normalized matrix having the same dimension as the second dimension (i.e., the number of columns) of the quantized spreading sequence matrix $S_{quan}$, and then multiply the normalized matrix with the quantized spreading sequence matrix $S_{quan}$ to obtain a final spreading sequence matrix $S_{final}$. Therefore, the processing unit 201 may determine the spreading sequence according to the final spreading sequence matrix $S_{final}$.

According to another example of this embodiment, the spreading sequence matrix may be generated according to quantized performance parameters of the plurality of user terminals, where the quantized performance parameters of the plurality of user terminals are generated by quantizing the performance parameters of the plurality of user terminals. For example, assuming that the performance parameters are average received powers of user terminals, the average received powers of the user terminals may be quantized firstly, and then the spreading sequence matrix may be generated according to the quantized average received powers.

Specifically, assuming that the performance parameters are average received powers of user terminals, Signal to Noise Ratios (SNRs) in dB of the user terminals may be generated firstly according to the average received powers of the user terminals, and then quantized SNRs are obtained by quantizing the SNRs of the user terminals in a predetermined quantization step size according to a predetermined rule. Then, quantized average received powers in watts of the user terminals are generated according to the quantized SNRs. Finally, the spreading sequence matrix is generated according to the quantized average received powers of the user terminals.

For example, according to average received powers of six user terminals, Signal to Noise Ratios of the six user terminals are generated as {−2.3, −1, −0.5, 3.6, 6.4, 7.5} (in dB), respectively. Then, the SNRs of the six user terminals are quantized according to a rule of rounding up with a quantization step size of 5 dB, to generate the quantized SNRs as {0, 0, 0, 5, 10, 10}, respectively. Then, quantized average received powers are generated according to the quantized SNRs {0, 0, 0, 5, 10, 10}. Finally, the spreading sequence matrix is generated according to the quantized average received powers of the six user terminals.

In this embodiment, a plurality of spread symbols may be generated when the initial symbols are spread by using the spreading sequence, and the number of the plurality of spread symbols and the spreading factor of the spreading sequence are the same. For example, when the spreading factor N=4, 4 spread symbols may be generated when the initial symbols are spread by using the spreading sequence.

According one example of this embodiment, assuming that the performance parameters are SINRs of user terminals, the processing unit 201 may determine the transmission power by using the power matrix described above, and then transmit the spread symbols by using the determined transmission power.

According to another example of this embodiment, after spreading the initial symbols to generate the spread symbols by using the spreading sequence, the generating unit 202 may further determine a real-time measured transmission power, where the real-time measured transmission power is generated according to actual measurement for one user terminal. Then, the spread symbols are transmitted by using the determined real-time measured transmission power to generate real-time measured performance parameters. Then, the performance parameters used to generate the spreading sequence matrix are adjusted according to the real-time measured performance parameters.

For example, assuming that the performance parameters are SINRs of user terminals, the generating unit 202 may use spreading sequences of the spreading sequence matrix to spread the initial symbols to generate spread symbols, and transmit the spread symbols of the plurality of user terminals with the real-time measured power matrix to generate real-time measured SINRs of the user terminals. Then, the real-time measured SINRs are compared with the SINRs used to generate the spreading sequence matrix. When the real-time measured SINR of one user terminal is smaller than its SINR used to generate the spreading sequence matrix, the SINR of the user terminal used to generate the spreading sequence matrix may be adjusted, for example, the SINR used to generate the spreading sequence matrix may be increased.

However, the present disclosure is not limited thereto. When the real-time measured SINR of one user terminal is less than its SINR used to generate the spreading sequence matrix, one or more user terminals whose real-time measured SINRs are not less than their SINRs used to generate the spreading sequence matrix may be found, and then the SINRs of the one or more user terminals used to generate the spreading sequence matrix may be reduced.

Furthermore, after a SINR used to generate the spreading sequence matrix is adjusted, the adjusted SINR may be used to generate the spreading sequence matrix next time.

The apparatus for generating spread symbols for a NOMA system provided according to this embodiment generates, for a plurality of user terminals having different average received powers, spreading sequences when the system capacity parameter achieves the optimal value under certain constraints, and generates spreading sequences according to SINRs of the plurality of user terminals when the system power parameter achieves the optimal value under certain constraints, thereby minimizing interference between user terminals.

In addition, block diagrams used in the description of the above embodiments illustrate blocks in units. These structural blocks may be implemented in arbitrary combination of hardware and/or software. Furthermore, means for implementing respective structural blocks is not particularly limited. That is, the respective structural blocks may be implemented by one apparatus that is physically and/or logically jointed; or more than two apparatuses that are physically and/or logically separated may be directly and/or indirectly connected (e.g., via wire and/or wireless), and the respective structural blocks may be implemented by these apparatuses.

Figure 3:
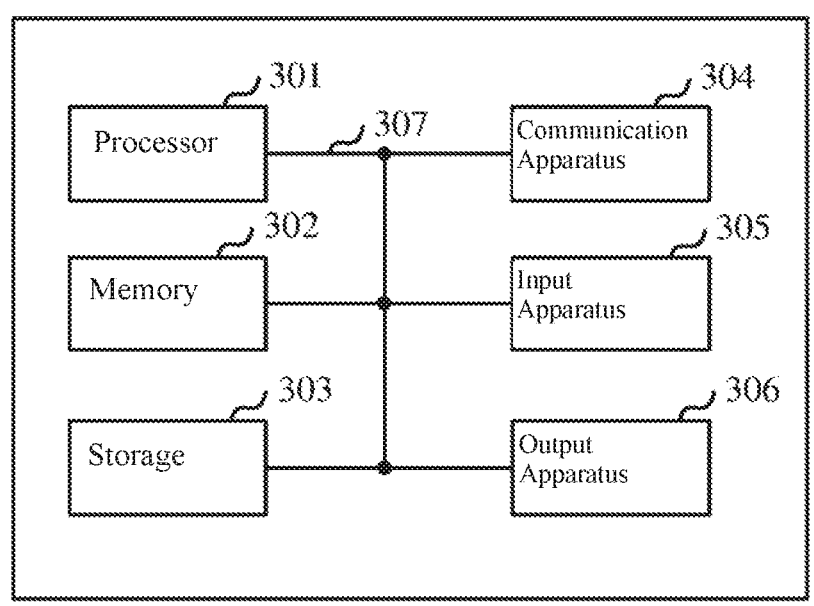
FIG. 3 shows a schematic diagram of a hardware structure of a related user equipment according to the embodiments of the present disclosure.

For example, the user equipment in the embodiments of the present disclosure may function as a computer that executes the processes of the reference signal transmission method for beam management of the present disclosure. FIG. 3 shows a schematic diagram of hardware structure of a related user equipment 300 according to one embodiment of the present disclosure. The above user equipment 300 may be constituted as a computer apparatus that physically comprises a processor 301, a memory 303, a storage 303, a communication apparatus 304, an input apparatus 305, an output apparatus 306, a bus 307 and the like In addition, in the following description, terms such as "apparatus" may be replaced with circuits, devices, units, and the like. The hardware structure of the user equipment 300 may include one or more of the respective apparatuses shown in the figure, or may not include a part of the apparatuses.

For example, only one processor 301 is illustrated, but there may be multiple processors. Furthermore, processes may be performed by one processor, or processes may be performed by more than one processor simultaneously, sequentially, or by other methods. In addition, the processor 301 may be installed by more than one chip.

Respective functions of the user equipment 300 may be implemented, for example, by reading specified software (program) on hardware such as the processor 301 and the memory 302, so that the processor 301 performs computations, controls communication performed by the communication apparatus 304, and controls reading and/or writing of data in the memory 302 and the storage 303.

The processor 301, for example, operates an operating system to control the entire computer. The processor 301 may be constituted by a Central Processing Unit (CPU), which includes interfaces with peripheral apparatuses, a control apparatus, a computing apparatus, a register and the like For example, the baseband signal processing unit, the call processing unit and the like described above may be implemented by the processor 301.

In addition, the processor 301 reads programs (program codes), software modules and data from the storage 303 and/or the communication apparatus 304 to the memory 302, and execute various processes according to them. As for the program, a program causing computers to execute at least a part of the operations described in the above embodiments may be employed. For example, a control unit of the user equipment 300 may be implemented by a control program stored in the memory 302 and operated by the processor 301, and other functional blocks may also be implemented similarly.

The memory 302 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 302 may also be referred to as a register, a cache, a main memory (a main storage apparatus) and the like. The memory 302 may store executable programs (program codes), software modules and the like for implementing wireless communication methods related to one embodiment of the present disclosure.

The storage 303 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 303 may also be referred to as an auxiliary storage apparatus.

The communication apparatus 304 is a hardware (transceiver device) performing communication between computers via a wired and/or wireless network, and is also referred to as a network device, a network controller, a network card, a communication module and the like, for example. The communication device 304 may include a high-frequency switch, a duplexer, a filter, a frequency synthesizer and the like to implement, for example, Frequency Division Duplex (FDD) and/or Time Division Duplex (TDD). For example, the transmitting and receiving antennas, amplifying unit, transmitting and receiving units, transmission path interfaces and the like described above may be implemented by the communication apparatus 304.

The input apparatus 305 is an input device (e.g., a keyboard, a mouse, a microphone, a switch, a button, a sensor and the like) that receives input from the outside. The output apparatus 306 is an output device (e.g., a display, a speaker, a Light Emitting Diode (LED) light and the like) that performs outputting to the outside. In addition, the input apparatus 305 and the output apparatus 306 may also be an integrated structure (e.g., a touch screen).

Furthermore, the respective apparatuses such as the processor 301 and the memory 302 are connected by the bus 307 that communicates information. The bus 307 may be constituted by a single bus or by different buses between the apparatuses.

Furthermore, the user equipment 300 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 301 may be installed by at least one of the hardware.

The terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

In addition, a radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (OFDM (Orthogonal Frequency Division Multiplexing) symbols, SC-FDMA (Single Carrier Frequency Division Multiple Access) symbols, etc.) in the time domain. Furthermore, the slot may also be a time unit based on the numerology. Furthermore, the slot may also include a plurality of microslots. Each microslot may be composed of one or more symbols in the time domain. Furthermore, a microslot may also be referred to as a "subframe".

A radio frame, a subframe, a slot, a microslot and a symbol all represent a time unit during signal transmission. A radio frame, a subframe, a slot, a microslot and a symbol may also use other names that correspond to them, respectively. For example, one subframe may be referred to as a "transmission time interval (TTI)", a plurality of consecutive subframes may also be referred to as a "TTI", and one slot or one microslot may also be referred to as a "TTI." That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

Herein, a TTI refers to the minimum time unit of scheduling in wireless communication, for example. For example, in LTE systems, a wireless base station performs scheduling for respective user terminals that allocates radio resources (such as frequency bandwidths and transmission power that can be used in respective user terminals) in units of TT. In addition, the definition of the TTI is not limited thereto.

The TTI may be a transmission time unit of channel-coded data packets (transport blocks), code blocks, and/or codewords, or may be a processing unit of scheduling, link adaptation and so on. In addition, when the TTI is given, a time interval (e.g., the number of symbols) mapped to transport blocks, code blocks, and/or codewords actually may also be shorter than the TTI.

In addition, when one slot or one microslot is called a TTI, more than one TTI (i.e., more than one slot or more than one microslot) may also become the minimum time unit of scheduling. Furthermore, the number of slots (the number of microslots) constituting the minimum time unit of the scheduling may be controlled.

A TTI having a time duration of 1 ms may also be referred to as a normal TTI (TTI in LTE Rel. 8-12), a standard TTI, a long TTI, a normal subframe, a standard subframe, or a long subframe, and so on. A TTI that is shorter than a normal TTI may also be referred to as a compressed TTI, a short TTI, a partial (or fractional) TTI, a compressed subframe, a short subframe, a microslot, a subslot, and so on.

In addition, a long TTI (e.g., a normal TTI, a subframe, etc.) may also be replaced with a TTI having a time duration exceeding 1 ms, and a short TTI (e.g., a compressed TTI, etc.) may also be replaced with a TTI having a TTI duration shorter than the long TTI and longer than 1 ms.

A resource block (RB) is a resource allocation unit in the time domain and the frequency domain, and may include one or more consecutive subcarriers in the frequency domain. Also, an RB may include one or more symbols in the time domain, and may be one slot, one microslot, one subframe or one TTI duration. One TTI and one subframe may be composed of one or more resource blocks, respectively. In addition, one or more RBs may also be referred to as "physical resource blocks (PRBs (Physical RBs))", "Sub-Carrier Groups (SCGs)", "Resource Element Groups (REGs)", "PRG pairs", "RB pairs" and so on.

Furthermore, a resource block may also be composed of one or more resource elements (REs). For example, one RE may be a radio resource area of one subcarrier and one symbol.

In addition, structures of the radio frames, subframes, slots, microslots and symbols, etc. described above are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously altered.

Furthermore, the information, parameters and so on described in this specification may be represented in absolute values or in relative values with respect to specified values, or may be represented by other corresponding information. For example, radio resources may be indicated by specified indices. Furthermore, equations and the like using these parameters may be different from those explicitly disclosed in this specification.

The names used for the parameters and the like in this specification are not limited in any respect. For example, since various channels (PUCCHs, PDCCHs, etc.) and information elements may be identified by any suitable names, the various names assigned to these various channels and information elements are not limited in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the aspects/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may be applied. At this time, functions provided by the wireless base station described above may be regarded as functions provided by the user terminals. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal may be regarded as functions provided by the wireless base station.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 2000, UMB (Ultra Mobile Broadband), IEEE 802.11 (Wi-Fi®), IEEE 802.16 (WiMAX®), IEEE 802.20, UWB (Ultra-WideBand), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A method performed by a terminal, the method comprising:
   determining a spreading sequence according to a spreading sequence matrix, wherein the spreading sequence matrix is generated according to performance parameters of a plurality of terminals;
   spreading initial symbols by using the determined spreading sequence to generate spread symbols;
   determining a real-time measured transmission power, wherein the real-time measured transmission power is generated according to an actual measurement for one terminal;
   transmitting the spread symbols by using the determined real-time measured transmission power to generate real-time measured performance parameters; and
   adjusting the performance parameters used for generating the spreading sequence matrix for next time transmission according to the real-time measured performance parameters.

2. A terminal comprising a memory and one or more processors coupled to the memory, the one or more processors configured to:
   determine a spreading sequence for the terminal according to a spreading sequence matrix, wherein the spreading sequence matrix is generated according to performance parameters of a plurality of terminals;
   spread initial symbols by using the determined spreading sequence to generate spread symbols;
   determine a real-time measured transmission power, wherein the real-time measured transmission power is generated according to an actual measurement for one terminal;
   transmit the spread symbols by using the determined real-time measured transmission power to generate real-time measured performance parameters; and
   adjust the performance parameters used for generating the spreading sequence matrix for next time transmission according to the real-time measured performance parameters.

3. The terminal of claim 2, wherein
   the spreading sequence matrix is constructed according to a first spreading sequence matrix related to a first part of terminals of the plurality of terminals and a second spreading sequence matrix related to a second part of terminals of the plurality of terminals, wherein
   determining the first part of terminals and the second part of terminals according to the performance parameters;
   generating the first spreading sequence matrix according to performance parameters of the first part of terminals;
   generating the second spreading sequence matrix according to performance parameters of the second part of terminals; and
   generating the spreading sequence matrix according to the first spreading sequence matrix and the second spreading sequence matrix.

4. The terminal of claim 2, wherein:
   a performance parameter includes a power parameter.

5. The terminal of claim 2, wherein:
   determining, for one terminal of the plurality of terminals, whether the terminal belongs to a first part of terminals or a second part of terminals according to a performance parameter of the terminal and the performance parameters of the plurality of terminals.

6. The terminal of claim 5, wherein:
   generating the second spreading sequence matrix according to the performance parameters of the second part of terminals and a system capacity parameter of a communication system including the plurality of terminals.

7. The terminal of claim 5, wherein:
   generating the second spreading sequence matrix according to the performance parameters of the second part of terminals and a system power parameter of a communication system including the plurality of terminals.

8. The terminal of claim 2, wherein:
   the spreading sequence matrix is generated according to quantized performance parameters of the plurality of terminals, wherein the quantized performance parameters of the plurality of terminals are generated according to quantization of the performance parameters of the plurality of terminals.

9. A base station comprising:
   a processing unit configured to determine a spreading sequence for a terminal according to a spreading sequence matrix, wherein the spreading sequence matrix is generated according to performance parameters of a plurality of terminals; and
   a generating unit configured to spread initial symbols by using the determined spreading sequence to generate spread symbols,
   wherein the processing unit is further configured to:
     determine a real-time measured transmission power, wherein the real-time measured transmission power is generated according to an actual measurement for one terminal;
     transmit the spread symbols by using the determined real-time measured transmission power to generate real-time measured performance parameters; and
     adjust the performance parameters used for generating the spreading sequence matrix for next time transmission according to the real-time measured performance parameters.

10. The base station of claim 9, wherein
    the spreading sequence matrix is constructed according to a first spreading sequence matrix related to a first part of terminals of the plurality of terminals and a second spreading sequence matrix related to a second part of terminals of the plurality of terminals, wherein
    determining the first part of terminals and the second part of terminals according to the performance parameters;
    generating the first spreading sequence matrix according to performance parameters of the first part of terminals;
    generating the second spreading sequence matrix according to performance parameters of the second part of terminals; and
    generating the spreading sequence matrix according to the first spreading sequence matrix and the second spreading sequence matrix.

11. The base station of claim 9, wherein:
    a performance parameter includes a power parameter.

12. The base station of claim 9, wherein:
    determining, for one terminal of the plurality of terminals, whether the terminal belongs to the first part of terminals or the second part of terminals according to a performance parameter of the terminal and the performance parameters of the plurality of terminals.

13. The base station of claim 12, wherein:
    generating the second spreading sequence matrix according to the performance parameters of the second part of terminals and a system capacity parameter of a communication system including the plurality of terminals.

14. The base station of claim 12, wherein:
    generating the second spreading sequence matrix according to the performance parameters of the second part of terminals and a system power parameter of a communication system including the plurality of terminals.

15. The base station of claim 9, wherein:
the spreading sequence matrix is generated according to quantized performance parameters of the plurality of terminals, wherein the quantized performance parameters of the plurality of terminals are generated according to quantization of the performance parameters of the plurality of terminals.

16. The terminal of claim 5, wherein:
a transmission power is determined according to a power matrix, wherein the power matrix is generated according to a first power matrix and a second power matrix, the first power matrix is generated according to the performance parameters of the first part of terminals and a noise parameter of a communication system including the plurality of terminals, and the second power matrix is generated according to the performance parameters of the second part of terminals and the noise parameter of the communication system including the plurality of terminals; and
the spread symbols are transmitted by using the determined transmission power.

17. The base station of claim 12, wherein the processing unit is further configured to:
determine a transmission power according to a power matrix, wherein the power matrix is generated according to a first power matrix and a second power matrix, the first power matrix is generated according to the performance parameters of the first part of terminals and a noise parameter of a communication system including the plurality of terminals, and the second power matrix is generated according to the performance parameters of the second part of terminals and the noise parameter of the communication system including the plurality of terminals; and
transmit the spread symbols by using the determined transmission power.

* * * * *